(12) United States Patent
Storz et al.

(10) Patent No.: US 10,479,419 B2
(45) Date of Patent: Nov. 19, 2019

(54) COMPOSITE REFRIGERATED SEMI-TRAILER AND METHOD OF MAKING THE SAME

(71) Applicant: Wabash National, L.P., Lafayette, IN (US)

(72) Inventors: Scott A. Storz, Lafayette, IN (US); Jeffrie Scott Bauer, Oxford, IN (US); Andrzej Wylezinski, Lafayette, IN (US)

(73) Assignee: WABASH NATIONAL, L.P., Lafayette, IN (US)

(*) Notice: Subject to any disclaimer, the term of this patent is extended or adjusted under 35 U.S.C. 154(b) by 131 days.

(21) Appl. No.: 15/438,667

(22) Filed: Feb. 21, 2017

(65) Prior Publication Data

US 2017/0240217 A1    Aug. 24, 2017

Related U.S. Application Data

(60) Provisional application No. 62/299,265, filed on Feb. 24, 2016.

(51) Int. Cl.
| | |
|---|---|
| *B62D 33/04* | (2006.01) |
| *B62D 21/02* | (2006.01) |
| *B62D 29/00* | (2006.01) |
| *B62D 29/04* | (2006.01) |
| *B62D 53/08* | (2006.01) |
| *B62D 21/20* | (2006.01) |
| *B62D 53/06* | (2006.01) |

(52) U.S. Cl.
CPC .......... *B62D 33/048* (2013.01); *B62D 21/02* (2013.01); *B62D 21/20* (2013.01); *B62D 29/001* (2013.01); *B62D 29/043* (2013.01); *B62D 53/068* (2013.01); *B62D 53/0842* (2013.01)

(58) Field of Classification Search
CPC ...... B62D 21/14; B62D 63/061; B62D 21/20; B62D 33/048; B62D 53/068; B62D 53/0842; B62D 21/02; B62D 29/043; B62D 29/001
See application file for complete search history.

(56) References Cited

U.S. PATENT DOCUMENTS

| | | |
|---|---|---|
| 3,557,992 A | 1/1971 | Reeves |
| 3,637,252 A | 1/1972 | Metsker |
| 4,418,507 A | 12/1983 | Roberts et al. |
| 4,685,720 A | 8/1987 | Oren |
| 4,758,299 A | 7/1988 | Burke |
| 4,976,490 A | 12/1990 | Gentle |

(Continued)

FOREIGN PATENT DOCUMENTS

| | | |
|---|---|---|
| AU | 713260 | 11/1999 |
| CA | 1329818 | 5/1994 |

(Continued)

OTHER PUBLICATIONS

Black, Sara, "Structural adhesives, Part I: Industrial," CompositesWorld, posted Apr. 11, 2016, 7 pages.

(Continued)

*Primary Examiner* — Darlene P Condra
(74) *Attorney, Agent, or Firm* — Faegre Baker Daniels LLP

(57) ABSTRACT

A refrigerated composite semi-trailer is disclosed that may improve thermal efficiency, fuel efficiency, and costs of manufacturing.

21 Claims, 26 Drawing Sheets

(56) References Cited

U.S. PATENT DOCUMENTS

| | | | |
|---|---|---|---|
| 5,346,233 A * | 9/1994 | Moser | B62D 53/068 |
| | | | 180/24.01 |
| 5,403,063 A | 4/1995 | Sjostedt et al. | |
| 5,429,066 A | 7/1995 | Lewit et al. | |
| 5,507,405 A | 4/1996 | Thomas | |
| 5,562,981 A | 10/1996 | Ehrlich | |
| 5,664,518 A | 9/1997 | Lewit et al. | |
| 5,700,118 A | 12/1997 | Bennett | |
| 5,765,639 A | 6/1998 | Muth | |
| 5,772,276 A | 6/1998 | Fetz et al. | |
| 5,800,749 A | 9/1998 | Lewit et al. | |
| 5,802,984 A | 9/1998 | Thoman | |
| 5,830,308 A | 11/1998 | Reichard | |
| 5,860,668 A | 1/1999 | Hull et al. | |
| 5,860,693 A | 1/1999 | Ehrlich | |
| 5,890,435 A | 4/1999 | Thoman | |
| 5,897,818 A | 4/1999 | Lewit et al. | |
| 5,908,591 A | 6/1999 | Lewit et al. | |
| 5,916,093 A | 6/1999 | Fecko | |
| 5,934,741 A * | 8/1999 | Beukers | B62D 29/046 |
| | | | 296/181.6 |
| 5,979,684 A | 11/1999 | Ohnishi | |
| 5,992,117 A | 11/1999 | Schmidt | |
| 6,004,492 A | 12/1999 | Lewit et al. | |
| 6,013,213 A | 1/2000 | Lewit et al. | |
| 6,076,693 A | 6/2000 | Reiter | |
| 6,082,810 A | 7/2000 | Bennett | |
| 6,092,472 A | 7/2000 | Thoman | |
| 6,199,939 B1 | 3/2001 | Ehrlich | |
| 6,206,669 B1 | 3/2001 | Lewit et al. | |
| 6,220,651 B1 | 4/2001 | Ehrlich | |
| 6,227,125 B1 | 5/2001 | Schroeder | |
| 6,247,747 B1 | 6/2001 | Kawanomoto | |
| 6,318,794 B1 | 11/2001 | Berube | |
| 6,349,988 B1 | 2/2002 | Foster | |
| 6,374,546 B1 | 4/2002 | Fecko | |
| 6,496,190 B1 | 12/2002 | Driemeyer et al. | |
| 6,497,190 B1 | 12/2002 | Lewit | |
| 6,505,883 B1 | 1/2003 | Ehrlich | |
| 6,543,469 B2 | 4/2003 | Lewit et al. | |
| 6,615,741 B2 | 9/2003 | Fecko | |
| 6,626,622 B2 | 9/2003 | Zubko | |
| 6,688,835 B1 | 2/2004 | Buher | |
| 6,723,273 B2 | 4/2004 | Johnson et al. | |
| 6,726,435 B1 * | 4/2004 | Williams | B60P 1/4442 |
| | | | 414/497 |
| 6,740,381 B2 | 5/2004 | Day et al. | |
| 6,745,470 B2 | 6/2004 | Foster et al. | |
| 6,755,998 B1 | 6/2004 | Reichard et al. | |
| 6,761,840 B2 | 7/2004 | Fecko | |
| 6,773,023 B2 * | 8/2004 | Athans | B62D 53/06 |
| | | | 280/433 |
| 6,824,341 B2 | 11/2004 | Ehrlich | |
| 6,843,525 B2 | 1/2005 | Preisler | |
| 6,854,791 B1 | 2/2005 | Jaggi | |
| 6,863,339 B2 | 3/2005 | Bohm | |
| 6,869,561 B2 | 3/2005 | Johnson et al. | |
| 6,877,940 B2 | 4/2005 | Nelson | |
| 6,893,075 B2 | 5/2005 | Fenton et al. | |
| 6,911,252 B2 | 6/2005 | Lewit et al. | |
| 6,986,546 B2 | 1/2006 | Ehrlich | |
| 7,000,978 B1 | 2/2006 | Messano | |
| 7,025,166 B2 | 4/2006 | Thomas | |
| 7,025,408 B2 | 4/2006 | Jones et al. | |
| 7,069,702 B2 | 7/2006 | Ehrlich | |
| 7,134,820 B2 | 11/2006 | Ehrlich | |
| 7,140,642 B2 * | 11/2006 | Ito | B60K 15/063 |
| | | | 280/834 |
| 7,182,396 B2 | 2/2007 | Taylor | |
| 7,219,952 B2 | 5/2007 | Taylor | |
| 7,264,305 B2 | 9/2007 | Kuriakose | |
| 7,353,960 B2 | 4/2008 | Seiter | |
| 7,407,216 B2 | 8/2008 | Taylor | |
| 7,434,520 B2 | 10/2008 | Zupancich | |
| 7,451,995 B2 | 11/2008 | Bloodworth et al. | |
| 7,461,888 B2 | 12/2008 | Brown | |
| 7,517,005 B2 | 4/2009 | Kuriakose | |
| 7,575,264 B1 | 8/2009 | Solomon | |
| 7,578,534 B2 | 8/2009 | Weariful, III | |
| 7,578,541 B2 | 8/2009 | Layfield | |
| 7,587,984 B2 | 9/2009 | Zupancich | |
| 7,588,286 B2 | 9/2009 | Lewallen | |
| 7,594,474 B2 | 9/2009 | Zupancich | |
| 7,608,313 B2 | 10/2009 | Solomon | |
| 7,621,589 B1 | 11/2009 | Gerome | |
| 7,704,026 B2 | 4/2010 | Roush | |
| 7,722,112 B2 | 5/2010 | Ehrlich | |
| 7,748,172 B2 | 7/2010 | Zupancich | |
| 7,762,618 B2 | 7/2010 | Lewallen | |
| 7,790,076 B2 | 9/2010 | Seiter | |
| 7,829,165 B2 | 11/2010 | Grandominico et al. | |
| 7,887,120 B2 | 2/2011 | Bovine | |
| 7,901,537 B2 | 3/2011 | Jones | |
| 7,905,072 B2 | 3/2011 | Verhaeghe | |
| 7,914,034 B2 | 3/2011 | Roush | |
| 7,931,328 B2 | 4/2011 | Lewallen | |
| 8,016,322 B2 | 9/2011 | Keehan | |
| 8,056,960 B2 | 11/2011 | Brown | |
| 8,186,747 B2 | 5/2012 | Bloodworth et al. | |
| 8,263,217 B2 | 9/2012 | Verhaeghe | |
| 8,342,588 B2 | 1/2013 | Skaradzinski | |
| 8,448,989 B2 | 5/2013 | Verhaeghe | |
| 8,465,042 B2 * | 6/2013 | Knollman | B62D 53/0842 |
| | | | 280/421 |
| 8,474,871 B1 | 7/2013 | Ludwick | |
| 8,696,048 B2 | 4/2014 | Griffin et al. | |
| 8,757,704 B2 | 6/2014 | Zhao et al. | |
| 8,814,255 B2 | 8/2014 | Yamaji et al. | |
| 8,876,193 B2 | 11/2014 | Kunkel et al. | |
| 8,950,144 B2 | 2/2015 | Padmanabhan | |
| 9,051,014 B2 | 6/2015 | Lookebill et al. | |
| 9,138,943 B2 | 9/2015 | Weinberg | |
| 9,138,974 B2 | 9/2015 | Weinberg | |
| 9,138,975 B2 | 9/2015 | Weinberg | |
| 9,174,656 B2 | 11/2015 | Heitmeyer | |
| 9,199,440 B2 | 12/2015 | Weinberg | |
| 9,205,635 B2 | 12/2015 | Weinberg | |
| 9,260,117 B2 | 2/2016 | Vande Sands | |
| 9,317,468 B2 | 4/2016 | Liebald et al. | |
| 9,339,987 B2 | 5/2016 | Weinberg | |
| 9,409,607 B2 | 8/2016 | Osten | |
| 9,434,421 B1 | 9/2016 | Lu | |
| 9,499,203 B1 | 11/2016 | Finley | |
| 9,566,769 B2 | 2/2017 | Weinberg | |
| 9,604,677 B2 | 3/2017 | McKinney | |
| 9,650,003 B2 | 5/2017 | Owens | |
| 9,708,009 B2 | 7/2017 | Vance | |
| 9,738,050 B2 | 8/2017 | Lee | |
| 9,744,753 B2 | 8/2017 | Sheffield | |
| 9,815,501 B2 | 11/2017 | McCormack | |
| 9,827,750 B2 | 11/2017 | Lookebill | |
| 9,828,164 B2 | 11/2017 | Denson | |
| 9,878,744 B2 | 1/2018 | Lu | |
| 9,884,660 B2 | 2/2018 | Fenton | |
| 9,884,661 B2 | 2/2018 | Fenton | |
| 9,889,637 B2 | 2/2018 | Weinberg | |
| 2001/0011832 A1 | 8/2001 | Ehrlich | |
| 2005/0194381 A1 | 9/2005 | Zupancich | |
| 2005/0241253 A1 | 11/2005 | Song et al. | |
| 2006/0065152 A1 | 3/2006 | Heitmeyer | |
| 2006/0108361 A1 | 5/2006 | Seiter | |
| 2006/0121244 A1 | 6/2006 | Godwin | |
| 2006/0123725 A1 | 6/2006 | Godwin | |
| 2006/0158005 A1 | 7/2006 | Brown | |
| 2006/0179733 A1 | 8/2006 | Padmanabhan | |
| 2006/0201081 A1 | 9/2006 | Godwin | |
| 2006/0219129 A1 | 10/2006 | Jarvis | |
| 2007/0095092 A1 * | 5/2007 | Wuerfel, III | B60P 3/20 |
| | | | 62/407 |
| 2007/0119850 A1 | 5/2007 | Seiter | |
| 2007/0132278 A1 | 6/2007 | Lester et al. | |
| 2007/0160793 A1 | 7/2007 | Cageao | |
| 2007/0194602 A1 | 8/2007 | Ehrlich | |

(56) References Cited

U.S. PATENT DOCUMENTS

| | | | |
|---|---|---|---|
| 2007/0216197 A1 | 9/2007 | Wuerfel, III | |
| 2007/0250025 A1 | 10/2007 | Sams | |
| 2008/0290057 A1 | 11/2008 | Zupancich | |
| 2008/0296930 A1* | 12/2008 | Roush | B60S 9/02 296/180.4 |
| 2009/0126600 A1 | 5/2009 | Zupancich | |
| 2009/0212533 A1* | 8/2009 | Verhaeghe | B32B 3/06 280/423.1 |
| 2009/0278386 A1 | 11/2009 | Ehrlich | |
| 2010/0101876 A1 | 4/2010 | Misencik | |
| 2010/0109309 A1 | 5/2010 | Kootstra | |
| 2011/0010057 A1* | 1/2011 | Kim | B60P 1/483 701/50 |
| 2011/0095574 A1 | 4/2011 | Brown | |
| 2011/0204611 A1 | 8/2011 | Ziegler | |
| 2012/0313348 A1* | 12/2012 | Pfaff | B62D 35/001 280/423.1 |
| 2013/0207413 A1 | 8/2013 | Lookebill et al. | |
| 2014/0199551 A1 | 7/2014 | Lewit | |
| 2014/0262011 A1 | 9/2014 | Lewit et al. | |
| 2014/0300134 A1 | 10/2014 | Gerst | |
| 2015/0054311 A1 | 2/2015 | Marchesano et al. | |
| 2015/0076861 A1 | 3/2015 | Padmanabhan | |
| 2015/0137560 A1 | 5/2015 | Presiler | |
| 2015/0158532 A1 | 6/2015 | Ayuzawa | |
| 2015/0203160 A1 | 7/2015 | Peterson et al. | |
| 2016/0101752 A1* | 4/2016 | Batzer | B62D 53/068 293/126 |
| 2016/0207484 A1* | 7/2016 | Rogers | B60R 19/565 |
| 2017/0057561 A1 | 3/2017 | Fenton | |
| 2017/0166263 A1 | 6/2017 | McKinney | |
| 2017/0210317 A1 | 7/2017 | Owens | |
| 2017/0240216 A1 | 8/2017 | Bauer | |
| 2017/0240217 A1 | 8/2017 | Storz | |
| 2017/0241134 A1 | 8/2017 | McCloud | |
| 2017/0247063 A1 | 8/2017 | Banerjee | |
| 2017/0282499 A1 | 10/2017 | LaRocco | |
| 2017/0334489 A1 | 11/2017 | Shin | |
| 2018/0037151 A1 | 2/2018 | Bauer et al. | |

FOREIGN PATENT DOCUMENTS

| | | |
|---|---|---|
| CA | 2181750 | 1/1997 |
| CA | 2199584 | 9/1997 |
| CA | 2253308 | 11/1997 |
| CA | 2551863 | 3/1998 |
| CA | 2219312 | 4/1998 |
| CA | 2242467 | 7/1999 |
| CA | 2261384 | 8/1999 |
| CA | 2265405 | 1/2000 |
| CA | 2275848 | 12/2000 |
| CA | 2382578 | 3/2001 |
| CA | 2455957 | 5/2004 |
| CA | 2768878 | 3/2005 |
| CA | 2811134 | 4/2006 |
| CA | 2529762 | 6/2006 |
| CA | 2650992 | 11/2006 |
| CA | 2528558 | 5/2007 |
| CA | 2565510 | 8/2007 |
| CA | 2604282 | 3/2008 |
| CA | 2689745 | 7/2009 |
| CA | 2689746 | 7/2009 |
| CA | 2689747 | 7/2009 |
| CA | 2689748 | 7/2009 |
| CA | 2689749 | 7/2009 |
| CA | 2689751 | 7/2009 |
| CA | 2797778 | 7/2009 |
| CA | 2802907 | 7/2009 |
| CA | 2763094 | 9/2009 |
| CA | 2788047 | 8/2011 |
| CA | 2848174 | 10/2014 |
| CA | 2894059 | 12/2015 |
| CA | 2807710 | 5/2016 |
| CA | 2977131 | 9/2016 |
| CA | 2958805 | 8/2017 |
| CA | 2958838 | 8/2017 |
| CA | 2958839 | 8/2017 |
| DE | 2617169 | 10/2013 |
| EP | 2660119 | 6/2013 |
| JP | 06293233 | 10/1994 |

OTHER PUBLICATIONS

CMS North America, Inc., "Transportation: Refrigerated Semi-trailers, Trailers & Vans," available online at http://www.cmsna.com/13_transportation_refrigerated_semi_trailers_trailers_vans.php on or before Jul. 2, 2014, 2 pages.

North American Composites, Virtual Engineered Composites (VEC) Article, available online at http://www.nacomposites.com/delivering-performance/page.asp?issueid=7&page=cover, Fall 2006, 4 pages.

Reichard, Dr. Ronnal P., "Composites in Theme Parks: From the perspective of a contractor- trouble shooter-enthusiast!" presented at Florida Institute of Technology at least as early as 1999, 37 pages.

Lightweight Structures B.V., "ColdFeather: lightweight composite isothermal trailer," available online at http://www.lightweight-structures.com/coldfeather-lightweight-composite-isothermal-trailer/index.html at least as early as Jun. 18, 2015, 6 pages.

Expedition Portal, "Truck Camper Construction Costs?," available online at http://www.expeditionportal.com/forum/threads/12486-Truck-Camper-Construction-Costs at least as early as Jun. 18, 2015, 5 pages.

Griffiths, Bob, "Rudder Gets New Twist with Composites," CompositesWorld, posted Aug. 1, 2006, 4 pages.

Morey, Bruce, "Advanced Technologies Supplement: Processes Reduce Composite Costs," Advanced Manufacturing, posted Apr. 1, 2007, 7 pages.

NetCompositesNow.com, "Twisted Composites Rudders," available online at http://www.netcomposites.com/news/twisted-composites-rudders/3202 as early as Aug. 11, 2005, 3 pages.

Eric Green Associates.com, "Composite Rudders Take Shape for U.S. Navy" available online at http://www. ericgreeneassociates.com/images/Composite_Twisted_Rudder.pdf, accessed as early as Jul. 13, 2014, 7 pages.

Seaver, Mark and Trickey, Stephen, "Underwater Blast Loading of a Composite Twisted Rudder with FBGS," dated Apr. 14, 2008, 19th International Conference on Optical Fibre Sensors, 2 pages.

Scott Bader Group Companies, Crystic, "Composites Handbook", 100 pages.

Kedward, Keith and Whitney, James, Delaware Composites Design Encyclopedia, "Design Studies," vol. 5, 1990, preview version available at https://books.google.com/books?id=9-KYOm81MWEC&printsec=frontcover#v=onepage&q&f=false, 17 pages.

Zweben, Carl, Handbook of Materials Selection, "Chapter 12: Composite Materials," 2002, preview version available at https://books.google.com/books?id=gWg-rchM700C&printsec=frontcover#v=onepage&q&f=false, 47 pages.

Johnson Truck Bodies, Blizzard Series brochure, accessed as early as Aug. 1, 2014, 8 pages.

International Trucking Shows, "True Composites Platform Highlight of International Trucking Show," Aug. 1992, 1 page.

Composite Twisted Rudder, TCC Meeting 2008, handout, 32 pages.

Composite Marine Control Surface, installed on USS Pioneer (MCM 9), May 1997, 13 pages.

Trailer/Body Builders, "More Emphasis on Less Weight," available at http://trailer-bodybuilders.com/trailers/more-emphasis-less-weight, May 1, 2008, 5 pages.

\* cited by examiner

COMPOSITE REFRIGERATED SEMI-TRAILER AND METHOD OF MAKING THE SAME

CROSS REFERENCE TO RELATED APPLICATION

This application claims priority to U.S. Provisional Patent Application Ser. No. 62/299,265, filed Feb. 24, 2016, the disclosure of which is hereby expressly incorporated by reference herein in its entirety.

FIELD OF THE DISCLOSURE

The present disclosure relates generally to semi-trailers and methods of making the same. More particularly, the present disclosure relates to refrigerated semi-trailers made of composite materials and methods of making the same.

BACKGROUND OF THE DISCLOSURE

Semi-trailers are used in the transportation industry for transporting many different types of cargo. Certain semi-trailers may be refrigerated and insulated to transport temperature-sensitive cargo. The use of metal components within the floor, roof, sidewalls, and/or nose of the semi-trailer may contribute to heat loss from the interior of the semi-trailer.

SUMMARY OF THE DISCLOSURE

A composite semi-trailer is disclosed that may improve thermal efficiency, fuel efficiency, and costs of manufacturing.

According to an exemplary embodiment of the present disclosure, a semi-trailer is disclosed for use with a tractor. The semi-trailer includes a composite floor having an upper surface, a lower surface, a right longitudinal support beam that extends from the lower surface, wherein the right longitudinal support beam is made from a composite material, and a left longitudinal support beam that extends from the lower surface, wherein the left longitudinal support beam is made from a composite material. The semi-trailer also includes a roof, a right sidewall coupled to the floor and the roof, a left sidewall coupled to the floor and the roof, and a nose coupled to the floor, the roof, the right sidewall, and the left sidewall. The semi-trailer further includes a slide rail assembly defining a plurality of holes configured to couple the semi-trailer to a wheel assembly, the slide rail assembly including a right rail coupled to the right longitudinal support beam of the composite floor, and a left rail coupled to the left longitudinal support beam of the composite floor.

According to another exemplary embodiment of the present disclosure, a semi-trailer is disclosed for use with a tractor. The semi-trailer includes a composite floor having an upper surface, a lower surface, a first longitudinal support beam that extends from the lower surface, wherein the first longitudinal support beam is made from a composite material, and a second longitudinal support beam that extends from the lower surface, wherein the second longitudinal support beam is made from a composite material. The semi-trailer also includes a roof, a right sidewall coupled to the floor and the roof, a left sidewall coupled to the floor and the roof, and a nose coupled to the floor, the roof, the right sidewall, and the left sidewall. The semi-trailer further includes a landing gear assembly configured to support the semi-trailer on the ground, the landing gear assembly coupled to the first and second longitudinal support beams of the composite floor.

According to another exemplary embodiment of the present disclosure, a semi-trailer is disclosed for use with a tractor. The semi-trailer includes a composite floor having a first internal support beam made from a composite material, a second internal support beam made from a composite material, and a recess defined between the first and second internal support beams. The semi-trailer also includes a roof, a right sidewall coupled to the floor and the roof, a left sidewall coupled to the floor and the roof, and a nose coupled to the floor, the roof, the right sidewall, and the left sidewall. The semi-trailer further includes a king pin assembly configured to couple the semi-trailer to the tractor, the king pin assembly being received within the recess and adhesively bonded to the first and second internal support beams of the composite floor.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
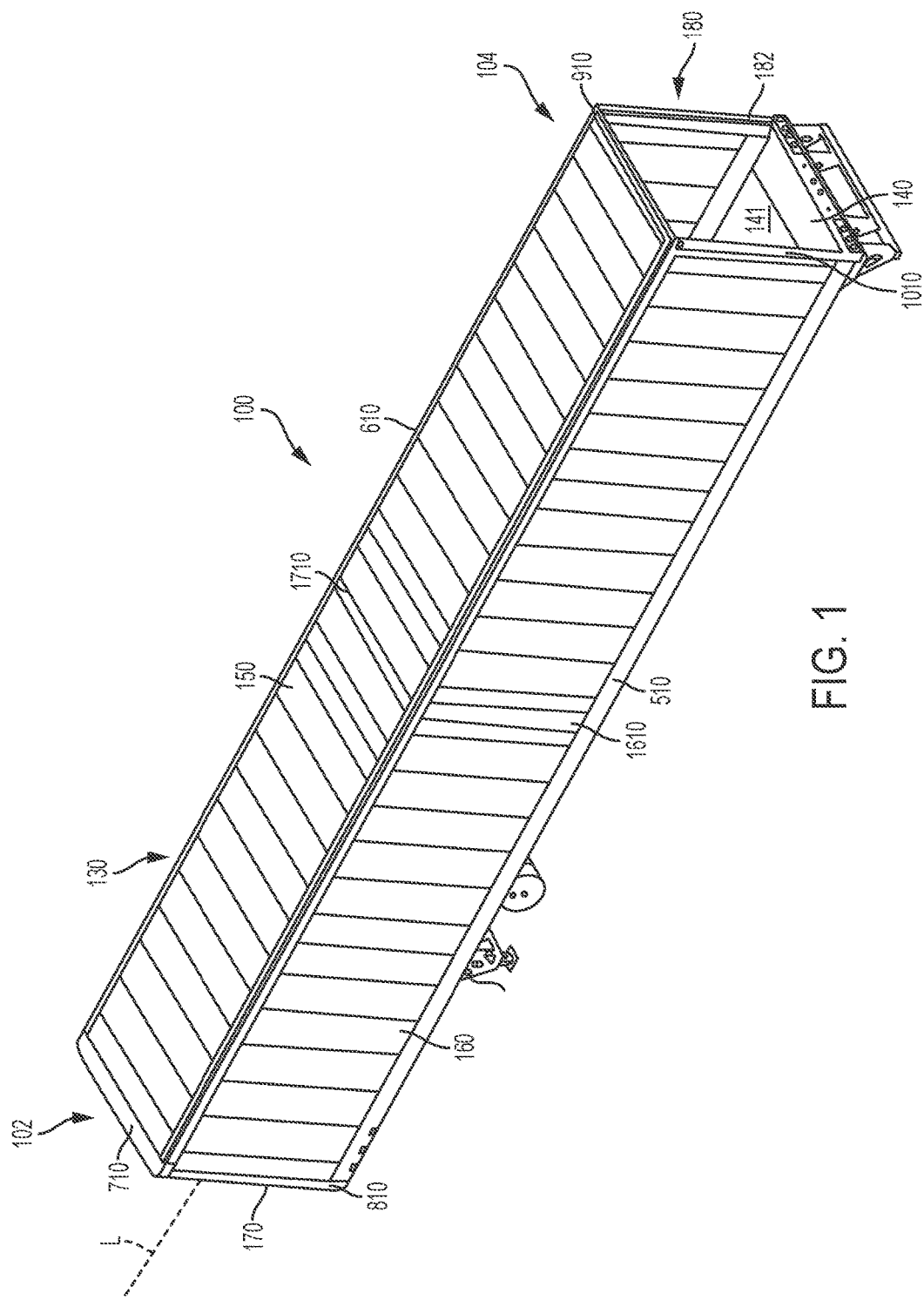
FIG. 1 is a top perspective view of a semi-trailer of the present disclosure, the semi-trailer including a cargo body with a floor, a roof, a right sidewall, a left sidewall, a nose, and a rear frame of a rear door assembly.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Semi-Trailer

Referring initially to FIGS. 1-4, a semi-trailer 100 is shown for supporting and transporting cargo. The illustrative trailer 100 extends along a longitudinal axis L from a front end 102 to a rear end 104. The illustrative trailer 100 includes a cargo body 130 with a floor 140, a roof 150, right and left sidewalls 160, a front wall or nose 170, and a rear door assembly 180 having a rear frame 182 and a door (not shown) to access the cargo body 130.

Figure 21:
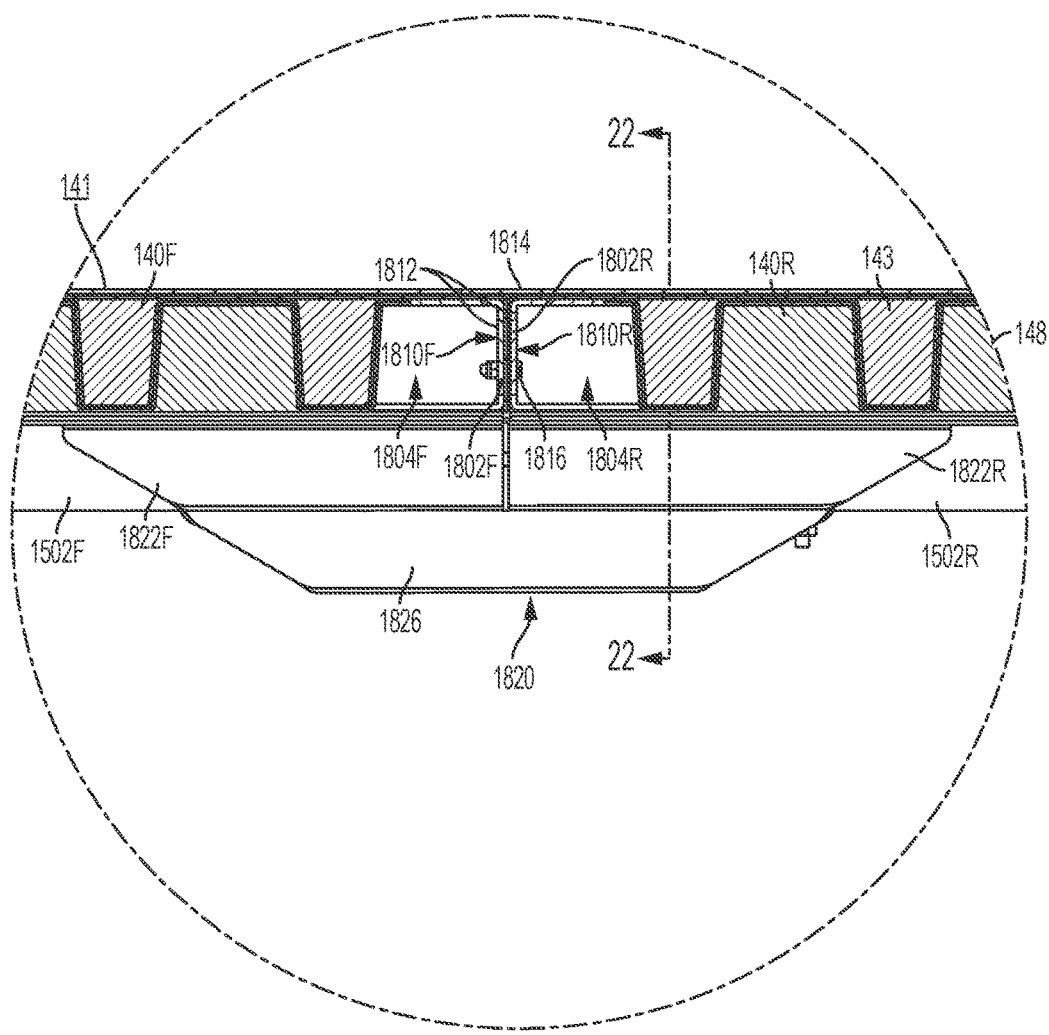
FIG. 21 is an assembled cross-sectional view of the connection of FIG. 20.

The floor 140 includes an upper surface 141 (i.e., platform) for supporting cargo and a lower surface 142 (e.g., underlayment) opposite the upper surface 141. Between upper surface 141 and lower surface 142, as shown in FIG. 21, floor 140 includes a plurality of transverse beams 143 and, optionally, a plurality of insert beams 148 positioned between adjacent transverse beams 143, both of which extend in a direction transverse to longitudinal axis L (FIG. 1). More information regarding the floor 140 may be found in U.S. Provisional Patent Application Ser. No. 62/299,215, filed Feb. 24, 2016, and titled "COMPOSITE FLOOR STRUCTURE AND METHOD OF MAKING THE SAME," the disclosure of which is expressly incorporated herein by reference in its entirety.

Figure 2:
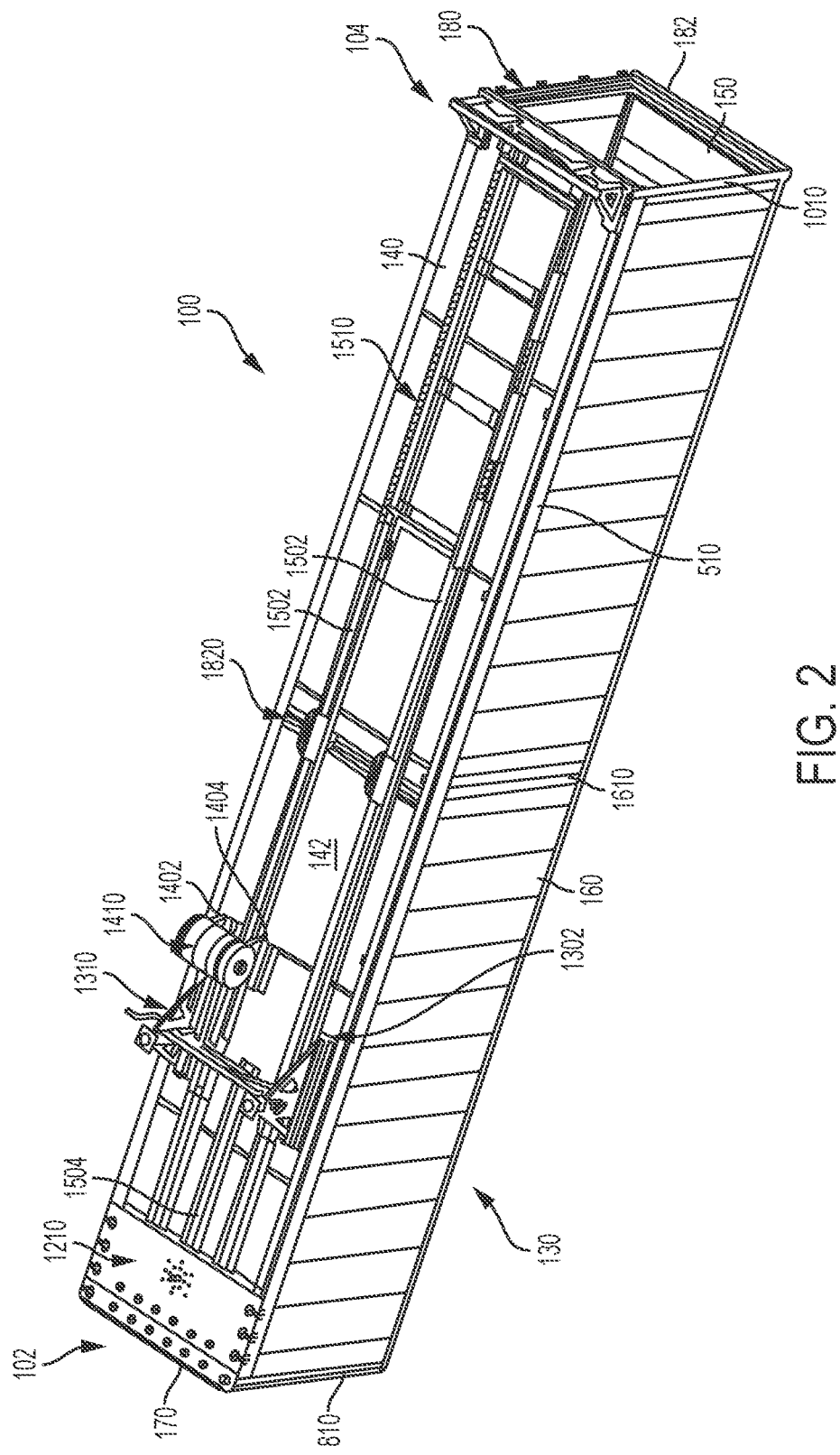
FIG. 2 is a bottom perspective view of the semi-trailer of FIG. 1, showing a coupler assembly, a landing gear assembly, a fuel tank assembly, and a slide rail assembly.
Figure 3:
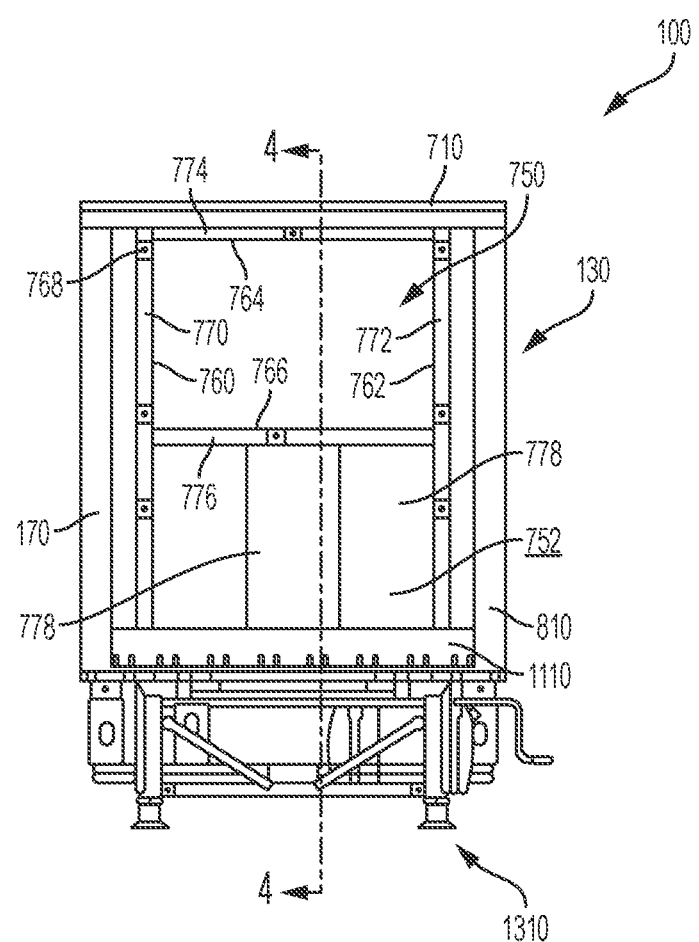
FIG. 3 front elevational view of the semi-trailer of FIG. 1.
Figure 4:
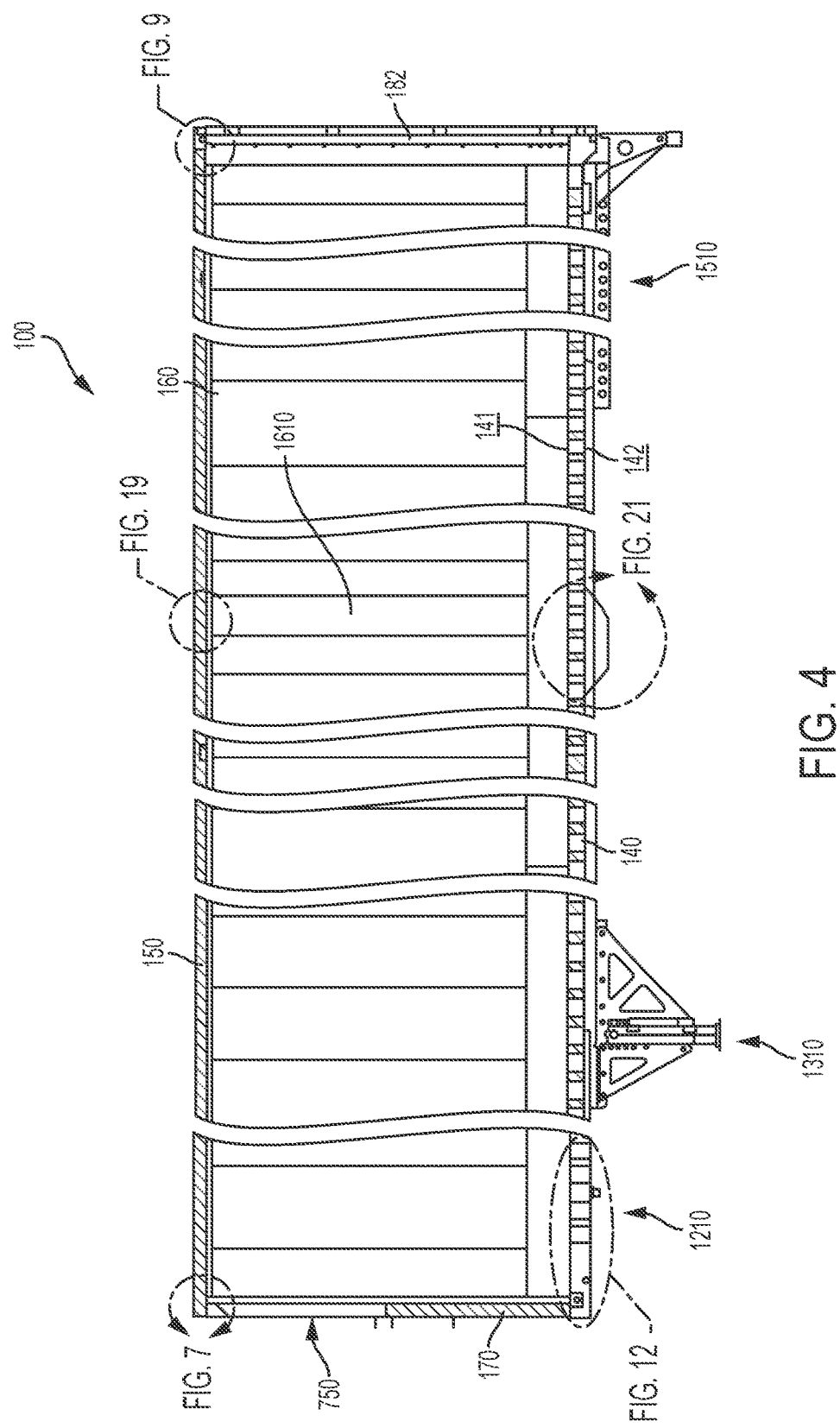
FIG. 4 is a cross-sectional view of the semi-trailer of FIG. 3, taken along line 4-4 of FIG. 3.

Moving from the front end 102 to the rear end 104 in FIG. 2, the trailer 100 also includes a coupler assembly 1210 configured to couple the cargo body 130 to a motorized tractor (not shown), a landing gear assembly 1310 configured to support the cargo body 130 on the ground, a fuel tank assembly 1410, and a slide rail assembly 1510 configured to couple the cargo body 130 to a rear wheel assembly (not shown). The front end 102 of the cargo body 130 may be supported atop the tractor (not shown) in a transport condition or atop the landing gear assembly 1310 in a stationary condition, and the rear end 104 of the cargo body 130 may be supported atop the wheel assembly (not shown).

In the illustrated embodiment of FIGS. 1-4, cargo body 130 of trailer 100 is an enclosed body. The cargo body 130 may be refrigerated and/or insulated to transport temperature-sensitive cargo. While the concepts of this disclosure are described in relation to a refrigerated trailer 100, it will be understood that they are equally applicable to other vehicles generally, and more specifically to conventional trailers (e.g., dry freight trailers, flatbed trailers, commercial trailers, small personal trailers) and/or box or van semi-trailers, and the like. Accordingly, those skilled in the art will appreciate that the present invention may be implemented in a number of different applications and embodiments and is not specifically limited in its application to the particular embodiments depicted herein.

The refrigerated trailer 100 may have various features in common with the refrigerated truck body shown and described in International Publication No. WO 2016/137974, filed Feb. 23, 2016, the disclosure of which is expressly incorporated herein by reference in its entirety.

2. Composite Materials

The cargo body 130 may be constructed, at least in part, of composite materials. For example, the floor 140, roof 150, right and left sidewalls 160, and/or nose 170 of the cargo body 130 may be constructed of composite materials. As such, the cargo body 130, as well as the floor 140, roof 150, right and left sidewalls 160, and/or nose 170 of the cargo body 130, may be referred to herein as composite structures. These composite structures may lack internal metal components. Also, each composite structure may be a single, unitary component, which may be formed from a plurality of layers permanently coupled together. Other elements of the cargo body 130 may be constructed of non-composite (e.g., metallic) materials. For example, the rear frame 182 of the cargo body 130 may be constructed of metallic materials.

The composite construction of the cargo body 130 may present certain advantages. First, because the composite structures may lack internal metal components, the composite cargo body 130 may have a reduced heat loss coefficient (Ua) and improved thermal efficiency. Also, the composite cargo body 130 may operate to minimize outgassing of blowing agents, minimize air loss, and minimize water intrusion. Additionally, the composite cargo body 130 may be lighter in weight than a typical metallic cargo body, which may improve fuel efficiency. Further, the composite cargo body 130 may have fewer metallic structures than a typical cargo body, which may make the cargo body 130 less susceptible to corrosion. Also, the composite cargo body 130 may include fewer parts than a typical metallic cargo body, which may simplify construction, reduce inventory, and reduce variation in manufacturing. Further, the composite cargo body 130 may be suitable for use with sensitive cargo, including foodstuffs, because the composite materials may be inert to avoid reacting with the cargo and other materials and because the composite materials may be easy to clean and maintain to ensure proper hygiene. As a result, the composite cargo body 130 may qualify as "food grade" equipment.

Composite materials are generally formed by combining two or more different constituents that remain separate and distinct in the final composite material. Exemplary composite materials include fiber-reinforced plastics (FRP), for example carbon-fiber-reinforced plastics (CRP). Such materials may be formed from an extruded preform assembly of a woven or stitched fiberglass cloth, a non-woven spun bond polymeric material, and a foam core (not shown). These preforms may be cut to size, combined in a mold resembling the final shape with other fiberglass and resin layers, and wetted with at least one resin and a catalyst to define a single structure during a curing process. The spun bond polymeric material may be mechanically stitched to the fiberglass cloth and/or the foam before the preforms are wetted with resin. In one embodiment, the spun bond material may be a polyester material, the foam may be a polyurethane material, and the resin may be a thermoset plastic resin matrix.

The individual preforms may be sized, shaped, and arranged in a manner that accommodates the strength requirements of the final structure. In areas of the final structure requiring less strength, the preforms may be relatively large in size, with the foam cores spanning relatively large distances before reaching the surrounding fiberglass and polymeric skins. By contrast, in areas of the final structure requiring more strength, the preforms may be relatively small in size, with the foam cores spanning relatively small distances before reaching the surrounding fiberglass and polymeric skins. For example, the preforms may be shaped as relatively wide panels in areas of the final structure requiring less strength and as relatively narrow support beams in areas of the final structure requiring more strength. Other exemplary techniques for strengthening such support beams include reinforcing the outer skins, such as by using uni-directional glass fibers or additional cloth in the outer skins, and/or reinforcing the inner cores, such as by using hard plastic blocks or higher density foam in the inner cores.

After the curing process, a coating may be applied to the inner and/or outer surfaces of the cured preforms. Additionally, metallic or non-metallic sheets or panels may be applied to the inner and/or outer surfaces of the cured preforms, either in place of the coating or with the coating. The metallic sheets or panels may be comprised of stainless steel, aluminum, and/or coated carbon steel, and the non-metallic sheets or panels may be comprised of carbon fiber composites, for example.

Exemplary composite structures include PRISMA® structures provided by Compsys, Inc. of Melbourne, Fla. Such composite structures may be manufactured using technology disclosed in the following patents and published patent applications, each of which is incorporated by reference in its entirety herein: U.S. Pat. Nos. 5,429,066, 5,800, 749, 5,664,518, 5,897,818, 6,013,213, 6,004,492, 5,908,591, 6,497,190, 6,911,252, 5,830,308, 6,755,998, 6,496,190, 6,911,252, 6,723,273, 6,869,561, 8,474,871, 6,206,669, and 6,543,469, and U.S. Patent Application Publication Nos. 2014/0262011 and 2014/0199551.

Other exemplary composite structures lack fiber-reinforced plastics and/or internal foam cores and, instead, may be comprised of polymeric cores (e.g., high-density polyethylene) with metal (e.g., high-strength steel) or polymeric outer skins coupled to the polymeric cores to provide a rigid but lightweight and durable composite materials. One example of such composite materials include DuraPlate® structures provided by Wabash National Corporation of Lafayette, Ind.

Still other exemplary composite structures may be comprised of a cellular polymeric and/or metallic material. For example, in one embodiment, the polymeric material may be comprised of a plastically deformable material, such as a thin thermoplastic material, a fiber composite material, a plastically deformable paper, or a metal sheet, which defines a cellular honeycomb structure. The cellular honeycomb structure may include open cells and/or closed cells and each cell may have a circular or polygonal cross-sectional shape. Additionally, the cellular honeycomb structure may be joined with covering layers on one or both sides thereof for generally enclosing at least a portion of the honeycomb structure. For example, the covering layers may be directly extruded or laminated onto the honeycomb structure and may be comprised of metal and/or polymeric materials. Such composite structures may be manufactured using technology disclosed in U.S. Pat. No. 6,726,974, issued on Apr. 27, 2004, and titled "THERMOPLASTIC FOLDED HONEYCOMB STRUCTURE AND METHOD FOR THE PRODUCTION THEREOF" and U.S. Pat. No. 8,795,806, issued on Aug. 5, 2014, and titled "HALF CLOSED THERMOPLASTIC HONEYCOMB, THEIR PRODUCTION PROCESS AND EQUIPMENT TO PRODUCE," both of which are expressly incorporated by reference in entirety herein.

3. Adhesive Bonding

Various connections or joints of the composite cargo body 130 may be assembled, at least in part, using adhesive bonding. The adhesive may be a structural adhesive that is suitable for load-bearing applications. The adhesive may have a lap shear strength greater than 1 MPa, 10 MPa, or more, for example. Exemplary adhesives include, for example, epoxies, acrylics, urethanes (single and two part), polyurethanes, methyl methacrylates (MMA), cyanoacrylates, anaerobics, phenolics, and/or vinyl acetates. The adhesive may be selected based on the needs of the particular application.

The method used to form an adhesive bond may also vary according to the needs of the particular application. First, the surfaces receiving the adhesive (i.e., adherends) may be pre-treated, such as by abrading the surfaces, applying a primer, and/or cleaning the surfaces with a suitable cleaner (e.g., denatured alcohol). Second, the adhesive may be applied to the surfaces over a predetermined application time (i.e., "open" time) and at a predetermined application temperature. In certain embodiments, the application temperature may be below the glass-transition temperature of the adhesive. Third, pressure may be applied to the surfaces, such as by using clamps, weights, vacuum bags, and/or ratchet straps, for example. Finally, the adhesive may be allowed to solidify. Some adhesives may undergo a chemical reaction in order to solidify, referred to as curing. This curing may occur over a predetermined cure time and at a predetermined cure temperature. In certain embodiments, the adhesive may be heated during curing such that the cure temperature is higher than the application temperature.

Using adhesive bonding to assemble the composite cargo body 130 rather than mechanical fasteners may present certain advantages. First, the composite structures may not require holes for mechanical fasteners, so the structural integrity of the composite structures may be maintained. Also, the adhesive bond may be stronger than a connection using mechanical fasteners. In fact, the strength of the adhesive bond may exceed the strength of the composite structures themselves, so the composite structures may delaminate or otherwise fail before the adhesive fails. Further, the elimination of mechanical fasteners may also provide improved aesthetics. Finally, the adhesive may form a seal between the adherends, which may help fill intentional or unintentional spaces between the adherends and insulate the cargo body 130.

4. Connectors

Various connections of the composite cargo body 130 may be assembled using one or more connectors, which may include brackets, braces, plates, and combinations thereof, for example. The connectors may vary in size and shape. For example, suitable connectors may be L-shaped, C-shaped, T-shaped, pi-shaped, flat, or bent.

The connectors may be constructed of metallic materials (e.g., aluminum, titanium, or steel), polymeric materials, wood, or composite materials. In certain embodiments, the connectors are constructed of materials which are dissimilar from the composite material used to construct the composite cargo body 130. The connectors may be fabricated by extrusion, pultrusion, sheet forming and welding, roll forming, and/or casting, for example.

The connectors may be adhesively bonded to composite structures of the cargo body 130. For example, the connectors may be adhesively bonded to the composite floor 140, the composite roof 150, the composite right and left sidewalls 150, and/or the composite nose 170 of the cargo body 130. The connectors may be mechanically fastened to non-composite (e.g., metallic) structures of the cargo body 130. For example, the connectors may be mechanically fastened to the metallic rear frame 182 of the cargo body 130. Suitable mechanical fasteners include bolts, rivets, and screws, for example.

Each connector may be a single-piece or a multi-piece construct. For multi-piece constructs, the pieces may be welded, mechanically fastened, adhered, snap-fit, or otherwise coupled together.

5. Connection Between Composite Sidewalls and Composite Floor

Figure 5:
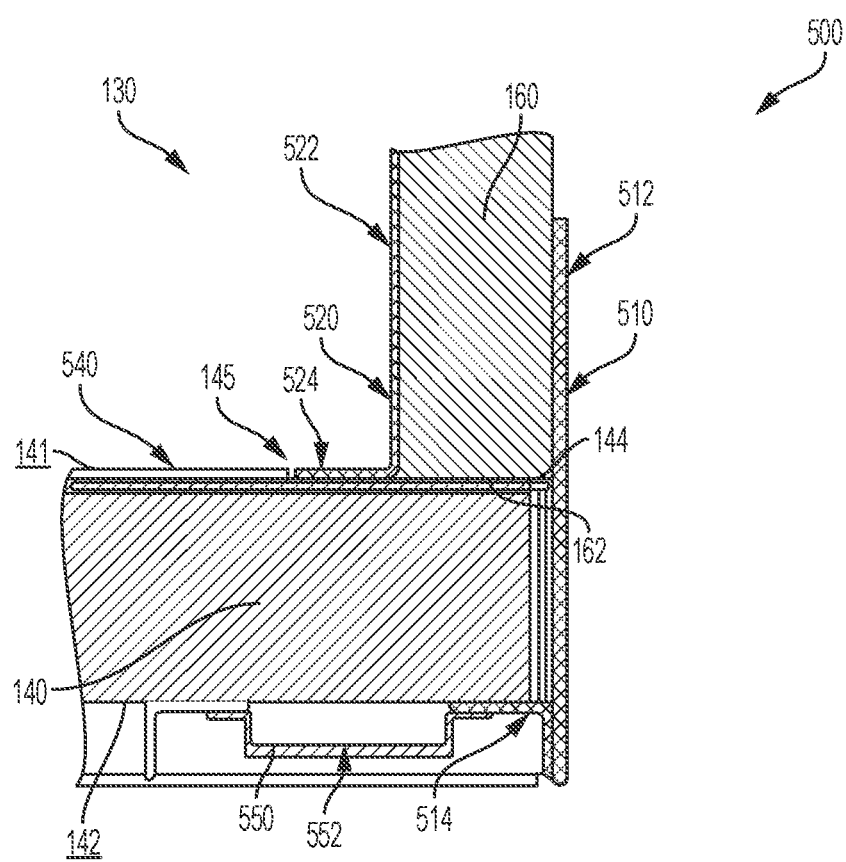
FIG. 5 is an assembled cross-sectional view of a connection between the sidewall and the floor.

Referring next to FIG. 5, a connection 500 is shown between the composite sidewall 160 and the composite floor 140. A lower end 162 of the composite sidewall 160 may rest directly atop an outer edge 144 of the composite floor 140 to form a direct connection 500. It is also within the scope of the present disclosure to apply adhesive or another filler (e.g., insulating tape, caulk, sealant, foam) between the composite sidewall 160 and the composite floor 140, such as when necessary to fill intentional or unintentional spaces between the components.

The connection 500 illustratively includes an exterior connector 510 positioned outside of the cargo body 130 and an interior connector 520 positioned inside of the cargo body 130. The illustrative exterior connector 510 is a corner bracket that is generally T-shaped in cross-section, having a vertical portion 512 and a horizontal portion 514. The illustrative exterior connector 510 is a multi-piece construct with a first piece and a second piece coupled together along and cooperating to form the vertical portion 512, but it is also within the scope of the present disclosure that the exterior connector 510 may be a single-piece construct. The illustrative interior connector 520 is a corner bracket that is generally L-shaped in cross-section, having a vertical portion 522 and a horizontal portion 524. Both the exterior connector 510 and the interior connector 520 may be elongate structures or rails that extend horizontally along the length of trailer 100. However, as discussed in Section 4 above, the exterior connector 510 and the interior connector 520 may vary in size and shape. For example, rather than being L-shaped as shown in FIG. 5, the interior connector 520 may be flat.

To assemble the connection 500, the exterior connector 510 may first be adhesively bonded to the composite floor 140. Specifically, portion 512 of the exterior connector 510 may be adhesively bonded to the composite floor 140 using adhesive. Portion 514 of the exterior connector 510 may wrap beneath the composite floor 140 with or without the need for additional adhesive. Next, the composite sidewall 160 may be lowered onto the outer edge 144 of the composite floor 140 and adhesively bonded to portion 512 of the exterior connector 510 using adhesive. It is also within the scope of the present disclosure to adhesively bond the lower end 162 of the composite sidewall 160 directly to the outer edge 144 of the composite floor 140. Finally, the interior connector 520 may be adhesively bonded to the composite sidewall 160 and the composite floor 140. Specifically, portion 522 of the interior connector 520 may be adhesively bonded to the composite sidewall 160 using adhesive, and portion 524 of the interior connector 520 may be adhesively bonded to the composite floor 140 using adhesive.

According to an exemplary embodiment of the present disclosure, the outer edge 144 of the composite floor 140 includes an outer recess 145 that is sized and shaped to receive portion 524 of the interior connector 520. When assembled, the composite floor 140 and the interior connector 520 may cooperate to define a flush surface 540 for cargo.

According to another exemplary embodiment of the present disclosure, connection 500 includes a trough 550 that defines a conduit 552 to accommodate electrical wiring, air lines, or other equipment beneath the composite floor 140. In the illustrated embodiment of FIG. 5, the trough 550 is coupled to the composite floor 140 through the exterior connector 510, specifically the horizontal portion 514 of the exterior connector 510. The trough 550 may be welded, mechanically fastened, adhered, or otherwise coupled to the exterior connector 510. It is also within the scope of the present disclosure that the trough 550 may be integrally formed with the exterior connector 510.

6. Connection Between Composite Sidewalls and Composite Roof

Figure 6:
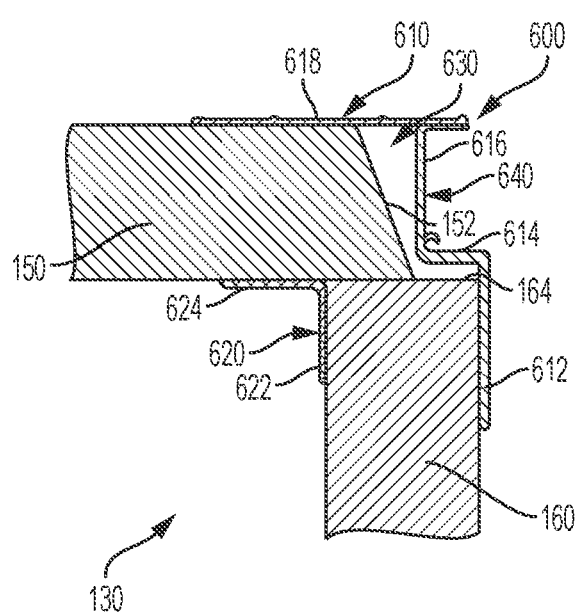
FIG. 6 is an assembled cross-sectional view of a connection between the sidewall and the roof.

Referring next to FIG. 6, a connection 600 is shown between the composite sidewall 160 and the composite roof 150. An outer edge 152 of the composite roof 150 may rest directly on an upper end 164 of the composite sidewall 160 to form a direct connection 600. It is also within the scope of the present disclosure to apply adhesive or another filler between the composite sidewall 160 and the composite roof 150, such as when necessary to fill intentional or unintentional spaces between the components.

The connection 600 illustratively includes an exterior connector 610 positioned outside of the cargo body 130 and an interior connector 620 positioned inside of the cargo body 130. The illustrative exterior connector 610 is a corner bracket that is generally a stepped L-shape in cross-section, having a first vertical portion 612, a first horizontal portion 614, a second vertical portion 616, and a second horizontal portion 618. The illustrative exterior connector 610 is a multi-piece construct with a first piece and a second piece coupled together along and cooperating to form the second horizontal portion 618, but it is also within the scope of the present disclosure that the exterior connector 610 may be a single-piece construct. The illustrative interior connector 620 is a corner bracket that is generally L-shaped in cross-section, having a vertical portion 622 and a horizontal portion 624. Both the exterior connector 610 and the interior connector 620 may be elongate structures or rails that extend horizontally along the length of trailer 100. However, as discussed in Section 4 above, the exterior connector 610 and the interior connector 620 may vary in size and shape.

To assemble the connection 600, the composite roof 150 may first be lowered onto the upper end 164 of the composite sidewall 160. It is within the scope of the present disclosure to adhesively bond the composite roof 150 directly to the composite sidewall 160 using adhesive. Next, the exterior connector 610 may be adhesively bonded to the composite sidewall 160 and the composite roof 150. Specifically, portion 612 of the exterior connector 610 may be adhesively bonded to the composite sidewall 160 using adhesive, and portion 618 of the exterior connector 610 may be adhesively bonded to the composite roof 150 using adhesive. Finally, the interior connector 620 may be adhesively bonded to the composite sidewall 160 and the composite roof 150. Specifically, portion 622 of the interior connector 620 may be adhesively bonded to the composite sidewall 160 using adhesive, and portion 624 of the interior connector 620 may be adhesively bonded to the composite roof 150 using adhesive.

According to an exemplary embodiment of the present disclosure, connection 600 includes an internal conduit 630 to accommodate electrical wiring, air lines, or other equipment. In the illustrated embodiment of FIG. 6, the outer edge 152 of the composite roof 150 is shortened and spaced apart from the exterior connector 610 to define conduit 630 therebetween. Also, the outer edge 152 of the composite roof 150 is chamfered in FIG. 6, which may reduce interference between the composite roof 150 and the exterior connector 610. The size, shape, and location of conduit 630 may vary.

According to another exemplary embodiment of the present disclosure, connection 600 includes an external conduit 640. In the illustrated embodiment of FIG. 6, portions 614, 616, 618 of the exterior connector 610 cooperate to define conduit 640 therebetween. The size, shape, and location of conduit 640 may vary.

7. Connection Between Composite Nose, Composite Roof, and Thermal Control Unit

Figure 7:
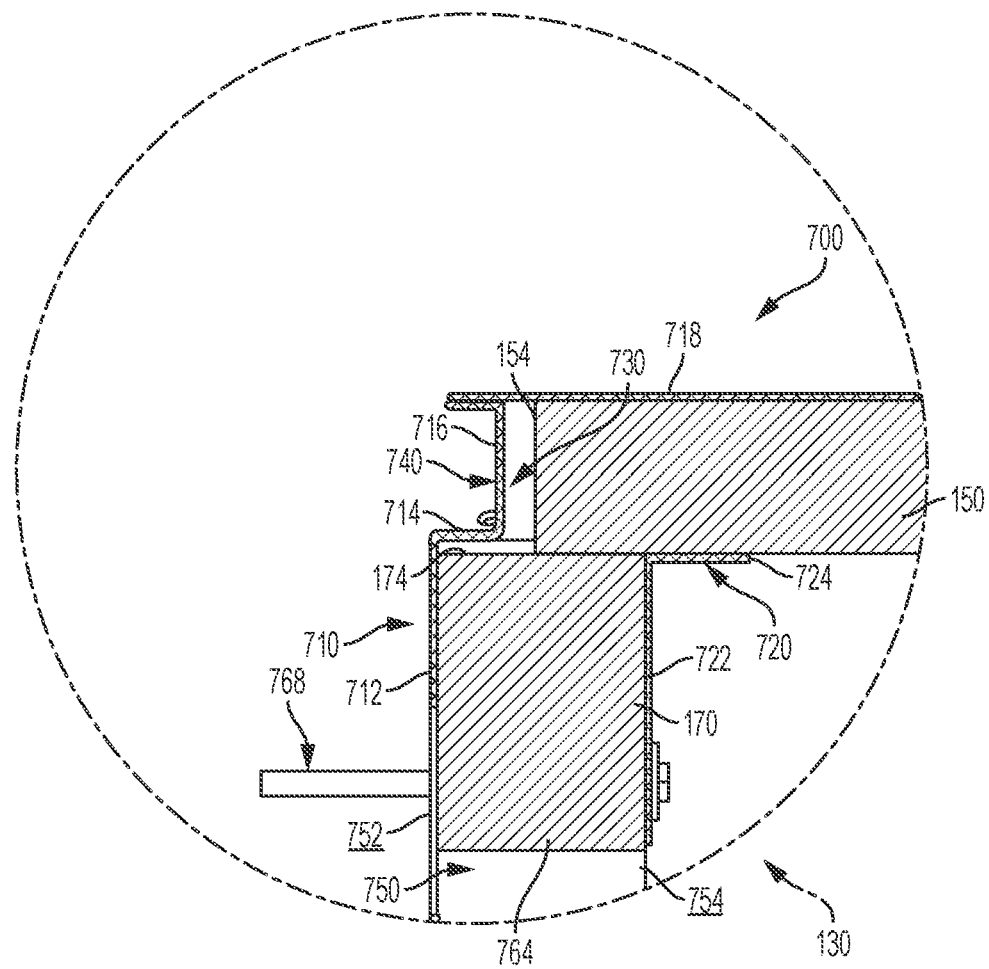
FIG. 7 is an assembled cross-sectional view of a connection between the nose and the roof.

Referring next to FIG. 7, a connection 700 is shown between the composite nose 170 and the composite roof 150. The upper end 174 of the composite nose 170 may rest directly beneath the front edge 154 of the composite roof 150 to form a direct connection 700. It is also within the scope of the present disclosure to apply adhesive or another filler between the composite nose 170 and the composite roof 150, such as when necessary to fill intentional or unintentional spaces between the components.

The connection 700 illustratively includes an exterior connector 710 positioned outside of the cargo body 130 and an interior connector 720 positioned inside of the cargo body 130. The connectors 710, 720 of the connection 700 may be similar to the connectors 610, 620 of the connection 600 (FIG. 6). The illustrative exterior connector 710 is a corner bracket that is generally a stepped L-shape in cross-section, having a first vertical portion 712, a first horizontal portion 714, a second vertical portion 716, and a second horizontal portion 718. The illustrative exterior connector 710 is a multi-piece construct with a first piece and a second piece coupled together along and cooperating to form the second horizontal portion 718, but it is also within the scope of the present disclosure that the exterior connector 710 may be a single-piece construct. The illustrative interior connector 720 is a corner bracket that is generally L-shaped in cross-section, having a vertical portion 722 and a horizontal portion 724. Both the exterior connector 710 and the interior connector 720 may be elongate structures or rails that extend horizontally along the width of trailer 100. However, as discussed in Section 4 above, the exterior connector 710 and the interior connector 720 may vary in size and shape.

To assemble the connection 700, the composite roof 150 may first be lowered onto an upper end 174 of the composite nose 170. It is within the scope of the present disclosure to adhesively bond the composite roof 150 directly to the composite nose 170 using adhesive. Next, the exterior connector 710 may be adhesively bonded to the composite nose 170 and the composite roof 150. Specifically, portion 712 of the exterior connector 710 may be adhesively bonded to the composite nose 170 using adhesive, and portion 718 of the exterior connector 710 may be adhesively bonded to the composite roof 150 using adhesive. In this position, the exterior connector 710 may protect the upper front end 102 of the trailer 100 from overhead objects, such as trees or garage doors, for example. Finally, the interior connector 720 may be adhesively bonded to the composite nose 170 and the composite roof 150. Specifically, portion 722 of the interior connector 720 may be adhesively bonded to the composite nose 170 using adhesive, and portion 724 of the interior connector 720 may be adhesively bonded to the composite roof 150 using adhesive.

According to an exemplary embodiment of the present disclosure, connection 700 includes an internal conduit 730 to accommodate electrical wiring, air lines, or other equipment. In the illustrated embodiment of FIG. 7, the front edge 154 of the composite roof 150 is shortened and spaced apart from the exterior connector 710 to define conduit 730 therebetween. The size, shape, and location of conduit 730 may vary. In certain embodiments, the conduit 730 that runs above the nose 170 may communicate with the conduits 630 that run above the side walls 160 (FIG. 6).

According to another exemplary embodiment of the present disclosure, connection 700 includes an external conduit 740. In the illustrated embodiment of FIG. 7, portions 714, 716, 718 of the exterior connector 710 cooperate to define conduit 740 therebetween. The size, shape, and location of conduit 740 may vary. In certain embodiments, the conduit 740 that runs above the nose 170 may communicate with the conduits 640 that run above the side walls 160 (FIG. 6).

Returning to FIG. 3, the composite nose 170 includes a rectangular opening 750 that extends through the composite nose 170 from an exterior surface 752 to an interior surface 754 to receive a thermal control unit (e.g., refrigeration unit) (not shown). Between the exterior surface 752 and the interior surface 754, the opening 750 is defined by a left vertical edge 760, a right vertical edge 762, an upper horizontal edge 764, and a lower horizontal edge 766 of the composite nose 170. The opening 750 may be formed in the composite nose 170 during the process of molding the composite nose 170 or after the process of molding the composite nose 170, such as by cutting the opening 750 into the composite nose 170. In the event that one or more of the edges 760, 762, 764, 766 is a raw foam rather than a fiberglass and/or polymer skin, the edges 760, 762, 764, 766 may be coated or treated to minimize water penetration and air leaks.

Returning to FIG. 7, the connection 700 between the composite nose 170 and the composite roof 150 may also support the connection between the composite nose 170 and the thermal control unit. Specifically, the connection 700 may support one or more mechanical fasteners 768 (e.g., bolts) between nose 170 and the thermal control unit. As shown in FIG. 7, the fastener 768 extends through a hole in the interior connector 720, through the nose 170, and through a hole in the exterior connector 710 to interact with the thermal control unit. In another embodiment, the fastener 768 may be coupled to the exterior connector 710 without extending entirely through the nose 170 to the interior connector 720. In these arrangements, the exterior connector 710 and/or the interior connector 720 may support the fastener 768 and distribute loads from the fastener 768 across the composite nose 170.

According to an exemplary embodiment of the present disclosure, the composite nose 170 may be internally and/or externally strengthened at or near the opening 750 to support the fasteners 768, the exterior connector 710, the interior connector 720, and the thermal control unit. Returning to FIG. 3, the composite nose 170 includes a left vertical support beam or cross-tie 770 positioned at the left vertical edge 760, a right vertical support beam or cross-tie 772 positioned at the right vertical edge 762, an upper horizontal support beam or header 774 positioned at the upper horizontal edge 764, and a lower horizontal support beam 776 positioned at the lower horizontal edge 766. The support beams 770, 772, 774, 776 may be composite structures that are relatively narrow compared to the relatively wide panels 778 that form the rest of the composite nose 170 and/or reinforced for additional strength, as discussed in Section 2 above. In certain embodiments, the reinforcements may be limited to the locations of the fasteners 768, the exterior connector 710, and the interior connector 720. These reinforcements may help prevent the composite nose 170 from crushing when hardware is tightened in place and may help distribute loads to other areas of the trailer 100.

The illustrative support beams 770, 772, 774, 776 are generally square in cross-section. However, the size and shape of the support beams 770, 772, 774, 776 may vary. For example, rather than being square in cross-section, the support beams 770, 772, 774, 776 may be rectangular, circular, or C-shaped in cross-section. It is also within the scope of the present disclosure to include other support beams in the composite nose 170.

To accommodate the thermal control unit, the nose 170 may have other features in common with the nose shown and described in the above-incorporated International Application No. PCT/US16/19100.

8. Connection Between Composite Nose and Composite Sidewalls

Figure 8:
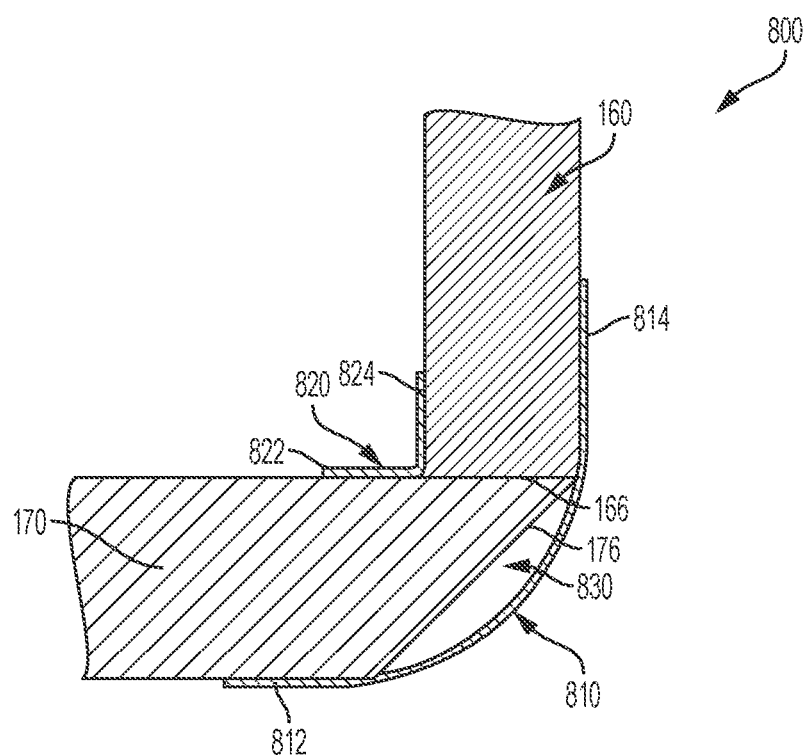
FIG. 8 is an assembled cross-sectional view of a connection between the nose and the sidewall.

Referring next to FIG. 8, a connection 800 is shown between the composite nose 170 and the composite sidewall 160. An outer edge 176 of the nose 170 may rest directly against a front end 166 of the composite sidewall 160 to form a direct connection 800. It is also within the scope of the present disclosure to apply adhesive or another filler between the composite nose 170 and the composite sidewall 160, such as when necessary to fill intentional or unintentional spaces between the components.

The connection 800 illustratively includes an exterior connector 810 positioned outside of the cargo body 130 and an interior connector 820 positioned inside of the cargo body 130. The illustrative exterior connector 810 is a curved corner bracket that is generally a rounded L-shape in cross-section, having a front portion 812 and a side portion 814. The illustrative interior connector 820 is a corner bracket that is generally L-shaped in cross-section, having a front portion 822 and a side portion 824. Both the exterior connector 810 and the interior connector 820 may be elongate structures or rails that extend vertically along the height of trailer 100. However, as discussed in Section 4 above, the exterior connector 810 and the interior connector 820 may vary in size and shape. For example, rather than being a rounded L-shape as shown in FIG. 8, the exterior connector 810 may be L-shaped or flat.

To assemble the connection 800, the outer edge 176 of the nose 170 may first be positioned against the front end 166 of the composite sidewall 160. It is within the scope of the present disclosure to adhesively bond the composite nose 170 directly to the composite sidewall 160. Next, the exterior connector 810 may be adhesively bonded to the composite nose 170 and the composite sidewall 160. Specifically, portion 812 of the exterior connector 810 may be adhesively bonded to the composite nose 170 using adhesive, and portion 814 of the exterior connector 810 may be adhesively bonded to the composite sidewall 160 using adhesive. Finally, the interior connector 820 may be adhesively bonded to the composite nose 160 and the composite sidewall 170. Specifically, portion 822 of the interior connector 820 may be adhesively bonded to the composite nose 160 using adhesive, and portion 824 of the interior connector 820 may be adhesively bonded to the composite sidewall 160 using adhesive.

According to an exemplary embodiment of the present disclosure, connection 800 includes a conduit 830 to accommodate electrical wiring, air lines, or other equipment. In the illustrated embodiment of FIG. 8, the outer edge 176 of the nose 170 is shortened and spaced apart from the exterior connector 810 to define conduit 830 therebetween. Also, the outer edge 176 of the nose 170 is chamfered in FIG. 8, which may reduce interference between the nose 170 and the exterior connector 810. The size, shape, and location of conduit 830 may vary. In certain embodiments, the conduit 830 that runs alongside the nose 170 may communicate with the conduit 730 that runs above the nose 170 (FIG. 7) and the conduits 630 that run above the side walls 160 (FIG. 6).

9. Connection Between Composite Roof and Metallic Rear Frame

Figure 9:
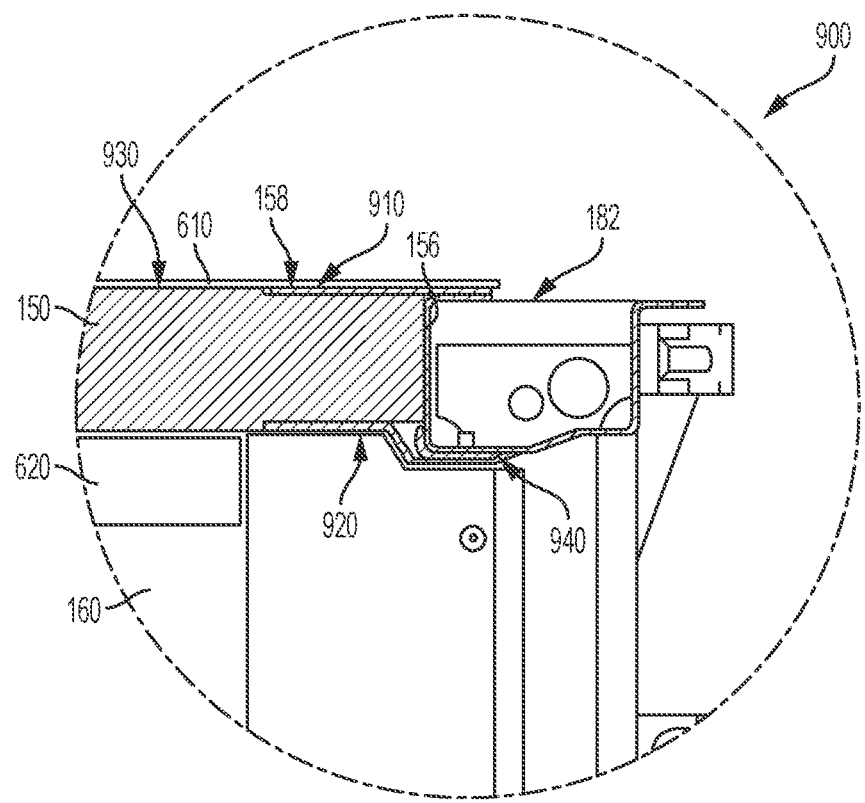
FIG. 9 is an assembled cross-sectional view of a connection between the roof and the rear frame.

Referring next to FIG. 9, a connection 900 is shown between the composite roof 150 and the metallic rear frame 182. A rear end 156 of the composite roof 150 may rest in front of the metallic rear frame 182. It is also within the scope of the present disclosure to apply adhesive or another filler between the composite roof 150 and the metallic rear frame 182, such as when necessary to fill intentional or unintentional spaces between the components.

The connection 900 illustratively includes an exterior connector 910 positioned outside of the cargo body 130 and an interior connector 920 positioned inside of the cargo body 130. The illustrative exterior connector 910 is a flat plate. The illustrative interior connector 920 is a bent plate. Both the exterior connector 910 and interior connector 920 are elongate structures or rails that extend horizontally along the width of trailer 100. However, as discussed in Section 4 above, the exterior connector 910 and the interior connector 920 may vary in size and shape. For example, rather than being flat as shown in FIG. 9, the exterior connector 910 may be bent or L-shaped.

To assemble the connection 900, the exterior connector 910 may be adhesively bonded to the composite roof 150 using adhesive and mechanically fastened to the metallic rear frame 182. This process may be repeated for the interior connector 920 by adhesively bonding the interior connector 920 to the composite roof 150 using adhesive and mechanically fastening the interior connector 920 to the metallic rear frame 182. It is also within the scope of the present disclosure that the exterior connector 910 and/or the interior connector 920 may be adhesively bonded to the metallic rear frame 182 rather than being mechanically fastened to the metallic rear frame 182. It is further within the scope of the present disclosure to adhesively bond the composite roof 150 directly to the metallic rear frame 182, with or without using the exterior connector 910 and/or the interior connector 920.

According to an exemplary embodiment of the present disclosure, the composite roof 150 includes a rear recess 158 that is sized and shaped to receive the exterior connector 910. When assembled, the composite roof 150 and the exterior connector 910 may cooperate to define a flush upper surface 930 that promotes water run-off from trailer 100. The flush upper surface 930 may also accommodate the above-described exterior connector 610 between the composite sidewall 160 and the composite roof 150.

According to another exemplary embodiment of the present disclosure, the connection 900 further includes a thermal break plate 940 positioned between the metallic interior connector 920 and the metallic rear frame 182. The thermal break plate 940 may be constructed of an insulating material to reduce or prevent heat transfer between the interior connector 920 and the rear frame 182.

10. Connection Between Composite Sidewalls and Metallic Rear Frame

Figure 10:
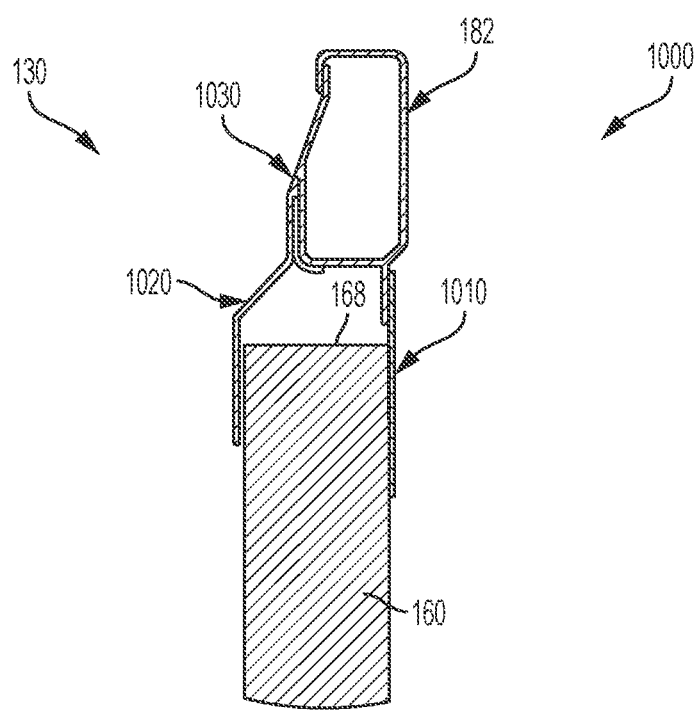
FIG. 10 is an assembled cross-sectional view of a connection between the sidewall and the rear frame.

Referring next to FIG. 10, a connection 1000 is shown between the composite sidewall 160 and the metallic rear frame 182. A rear end 168 of the composite sidewall 160 may rest in front of the metallic rear frame 182. It is also within the scope of the present disclosure to apply adhesive or another filler between the composite sidewall 160 and the metallic rear frame 182, such as when necessary to fill intentional or unintentional spaces between the components.

The connection 1000 illustratively includes an exterior connector 1010 positioned outside of the cargo body 130 and an interior connector 1020 positioned inside of the cargo body 130. The illustrative exterior connector 1010 is a flat plate. The illustrative interior connector 1020 is a bent plate. Both the exterior connector 1010 and interior connector 1020 are elongate structures or rails that extend vertically along the height of trailer 100. However, as discussed in Section 4 above, the exterior connector 1010 and the interior connector 1020 may vary in size and shape. For example, rather than being flat as shown in FIG. 10, the exterior connector 1010 may be bent or L-shaped.

To assemble the connection 1000, the exterior connector 1010 may be adhesively bonded to the composite sidewall 160 using adhesive and mechanically fastened to the metallic rear frame 182. This process may be repeated for the interior connector 1020 by adhesively bonding the interior connector 1020 to the composite sidewall 160 using adhesive and mechanically fastening the interior connector 1020 to the metallic rear frame 182. It is also within the scope of the present disclosure that the exterior connector 1010 and/or the interior connector 1020 may be adhesively bonded to the metallic rear frame 182 rather than being mechanically fastened to the metallic rear frame 182. It is further within the scope of the present disclosure to adhesively bond the composite sidewall 160 directly to the metallic rear frame 182, with or without using the exterior connector 1010 and/or the interior connector 1020.

According to another exemplary embodiment of the present disclosure, the connection 1000 includes a thermal break plate 1030 positioned between the metallic interior connector 1020 and the metallic rear frame 182. The thermal break plate 1030 may be constructed of an insulating material to reduce or prevent heat transfer between the interior connector 1020 and the rear frame 182.

11. Connection Between Composite Floor and Composite Nose

Figure 12:
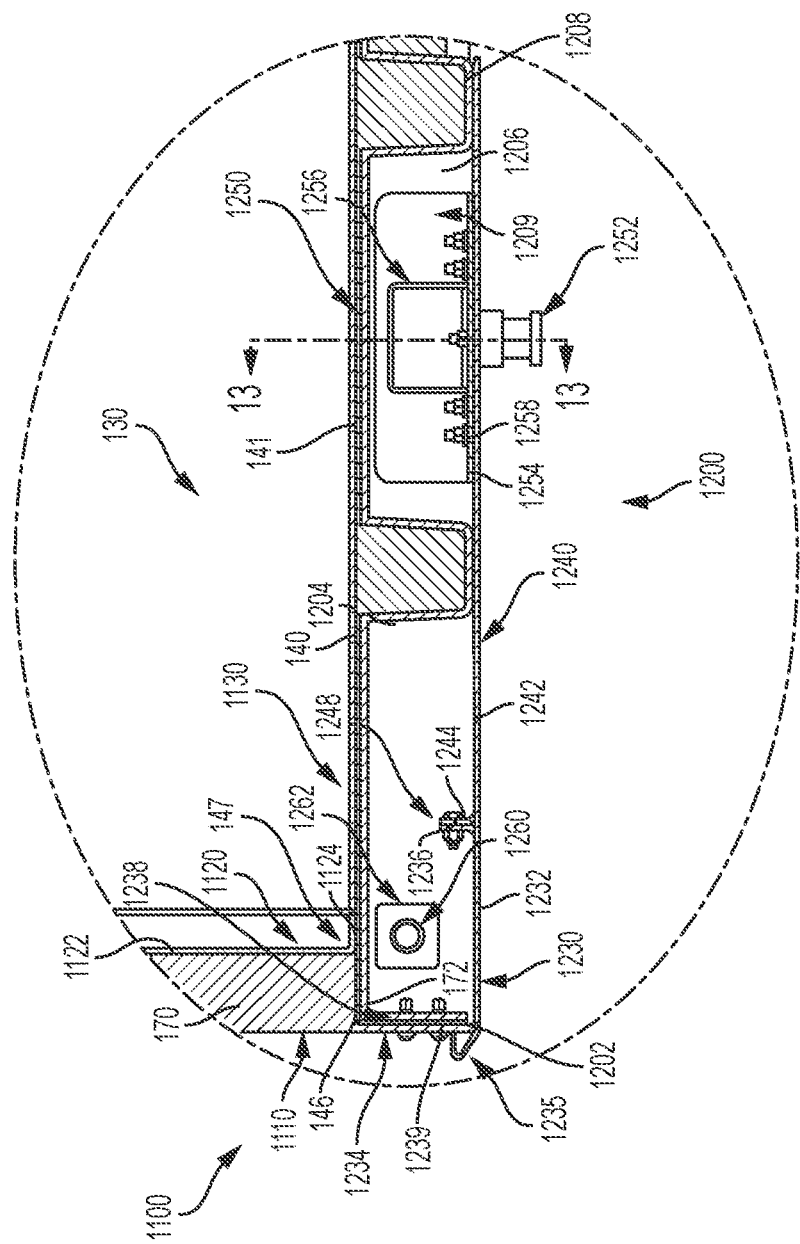
FIG. 12 is an assembled cross-sectional view of the connection of FIG. 11.

Referring next to FIG. 12, a connection 1100 is shown between the composite floor 140 and the composite front wall or nose 170. A lower end 172 of the composite nose 170 may rest directly atop a front edge 146 of the composite floor 140 to form a direct connection 1100. It is also within the scope of the present disclosure to apply adhesive or another filler between the composite nose 170 and the composite floor 140, such as when necessary to fill intentional or unintentional spaces between the components.

The connection 1100 illustratively includes an exterior connector 1110 positioned outside of the cargo body 130 and an interior connector 1120 positioned inside of the cargo body 130. The illustrative exterior connector 1110 is a flat plate. The illustrative interior connector 1120 is a corner bracket that is generally L-shaped in cross-section, having a vertical portion 1122 and a horizontal portion 1124. Both the exterior connector 1110 and the interior connector 1120 may be elongate structures or rails that extend horizontally along the width of trailer 100. However, as discussed in Section 4 above, the exterior connector 1110 and the interior connector 1120 may vary in size and shape. For example, rather than being flat as shown in FIG. 12, the exterior connector 1110 may be L-shaped.

To assemble the connection 1100, the exterior connector 1110 may first be mechanically fastened to the composite floor 140, as discussed further in Section 12 below. Next, the composite nose 170 may be lowered onto the front edge 146 of the composite floor 140 and adhesively bonded to the exterior connector 1110 using adhesive. It is also within the scope of the present disclosure to adhesively bond the lower end 172 of the composite nose 170 directly to the front edge 146 of the composite floor 140. Finally, the interior connector 1120 may be adhesively bonded to the composite nose 170 and the composite floor 140. Specifically, portion 1122 of the interior connector 1120 may be adhesively bonded to the composite nose 170 using adhesive, and portion 1124 of the interior connector 1120 may be adhesively bonded to the composite floor 140 using adhesive.

According to an exemplary embodiment of the present disclosure, the front edge 146 of the composite floor 140 includes a front recess 147 that is sized and shaped to receive portion 1124 of the interior connector 1120. When assembled, the composite floor 140 and the interior connector 1120 may cooperate to define a flush surface 1130 for cargo.

12. Connection Between Composite Floor and Metallic Coupler Assembly

Figure 11:
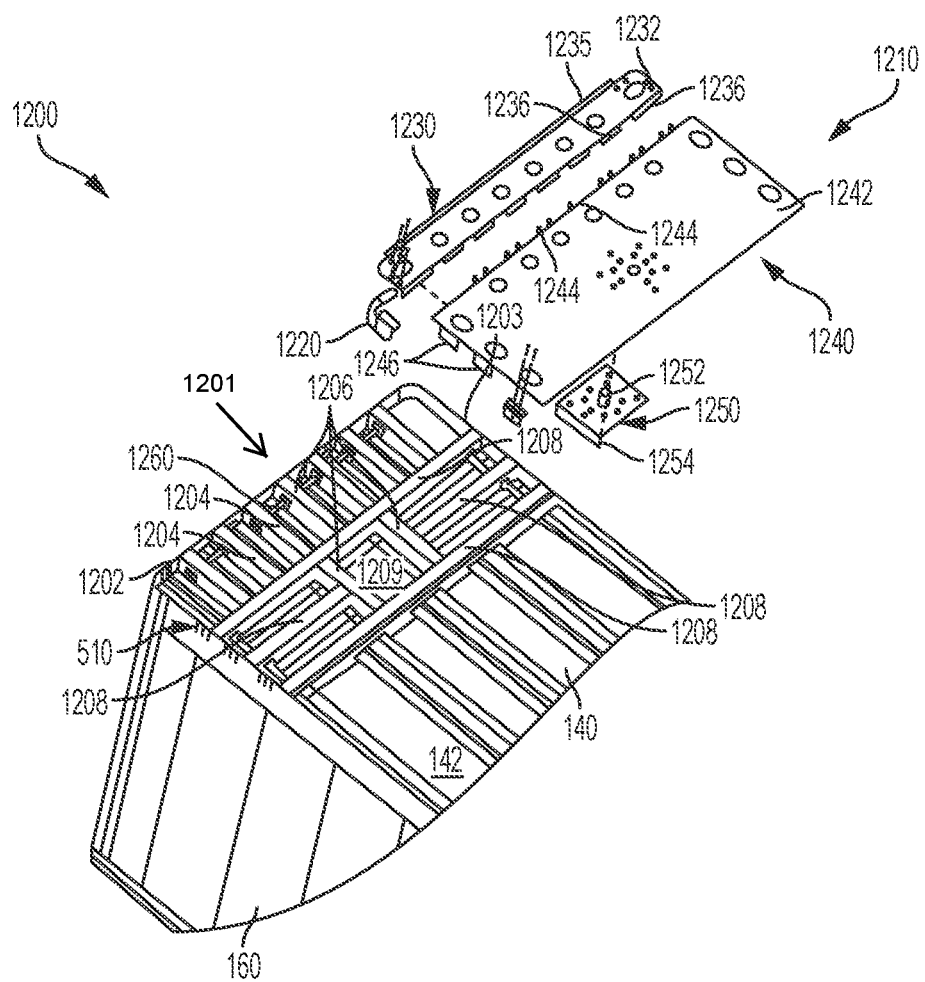
FIG. 11 is an exploded bottom perspective view of a connection between the floor and the coupler assembly.
Figure 13:
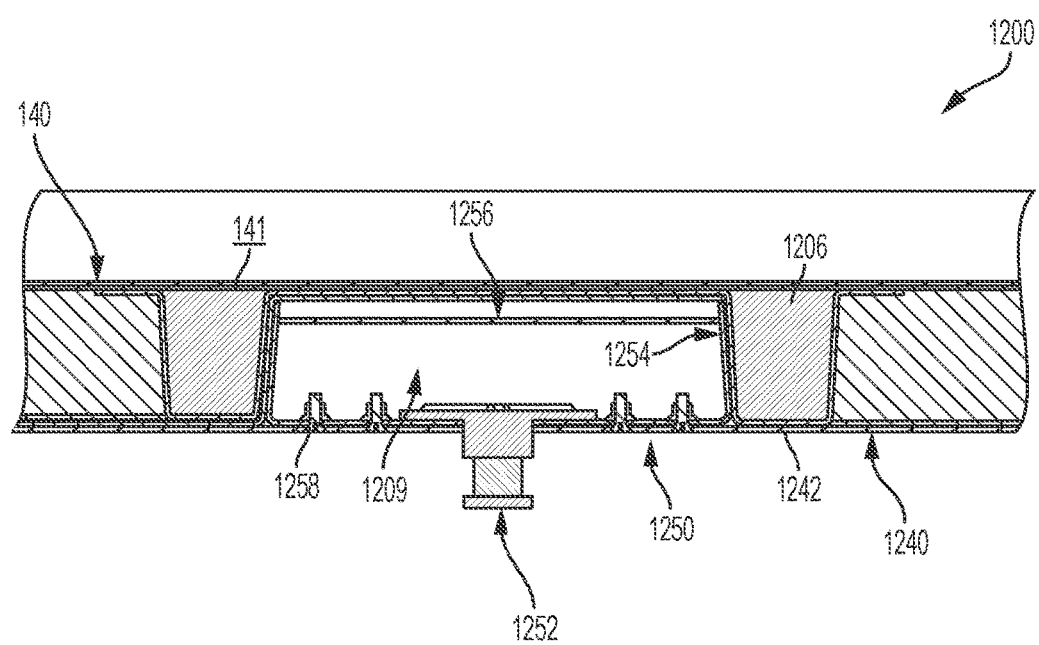
FIG. 13 is an assembled cross-sectional view of the connection of FIG. 12, taken along line 13-13 of FIG. 12.

Referring next to FIGS. 11-13, a connection 1200 is shown between the composite floor 140 and the coupler assembly 1210. At the connection 1200, the composite floor 140 includes a composite skirt 1201 including a composite front wall 1202 and composite right and left side walls 1203. The composite floor 140 also includes a matrix of internal support beams positioned at or above the lower surface 142 of the floor 140, illustratively a plurality of forward longitudinal support beams 1204, a plurality of rearward longitudinal support beams 1206, and a plurality of rearward lateral support beams 1208 positioned inside composite skirt 1201. Some or all of the support beams 1204, 1206, 1208 may be composite structures that are relatively narrow and/or reinforced for additional strength, as discussed in Section 2 above. The longitudinal support beams 1206 and the lateral support beams 1208 may cooperate to define a square-shaped opening 1209 to receive the coupler assembly 1210, as discussed further below.

The coupler assembly 1210 extends across the width of trailer 100 and illustratively includes right and left front corner reinforcements 1220, an approach plate subassembly 1230, a grid plate subassembly 1240, and a king pin subassembly 1250, some or all of which may be metallic structures. The coupler assembly 1210 may be a single-piece or a multi-piece construct. For multi-piece constructs, the pieces may be welded, mechanically fastened, adhered, snap-fit, or otherwise coupled together. When the connection 1200 is assembled, the approach plate subassembly 1230 and the grid plate subassembly 1240 may be generally aligned with the lower surface 142 of the floor 140.

The approach plate subassembly 1230 illustratively includes a horizontal approach plate 1232, a front connector 1234 with a front edge reinforcement 1235, and a series of spaced-apart rear connectors 1236. The front edge reinforcement 1235 is generally V-shaped in cross-section to reinforce and stiffen the approach plate 1232 when coupling the trailer 100 to the tractor (not shown). The illustrative front connector 1234 is a flat plate or rail that projects integrally and vertically from the horizontal approach plate 1232 and extends horizontally along the width of trailer 100. The illustrative rear connectors 1236 are flat plates that project integrally and vertically from the horizontal approach plate 1232. The approach plate subassembly may be associated with a series of spaced-apart interior connectors 1238 positioned longitudinally between the front connector 1234 and the rear connectors 1236. The illustrative interior connectors 1238 are flat plates. However, as discussed in Section 4 above, the front connector 1234, rear connectors 1236, and interior connectors 1238 may vary in size and shape.

The grid plate subassembly 1240 illustratively includes a horizontal grid plate 1242, a series of spaced-apart front connectors 1244, and a series of side connectors 1246. The illustrative front connectors 1244 are flat plates that project integrally and vertically from the horizontal grid plate 1242. The illustrative side connectors 1246 are L-shaped plates that are mechanically fastened to the grid plate 1242 and extend vertically therefrom. As discussed in Section 4 above, the front connectors 1244 and side connectors 1246 may vary in size and shape. In the illustrated embodiment of FIG. 12, the grid plate subassembly 1240 is mechanically fastened to the approach plate subassembly 1230 by inserting fasteners 1248 horizontally through the front connectors 1244 of the grid plate subassembly 1240 and the corresponding rear connectors 1236 of the approach plate subassembly 1230. It is also within the scope of the present disclosure that the grid plate subassembly 1240 may be adhered to or integrally formed with the approach plate subassembly 1230. In other embodiments, the grid plate subassembly 1240 may be separated and uncoupled from the approach plate subassembly 1230.

The king pin subassembly 1250 illustratively includes a king pin 1252, a longitudinal support channel 1254 having an upright U-shape in cross-section, as shown in FIG. 13, and a lateral support channel 1256 having a downward U-shape in cross-section, as shown in FIG. 13. In the illustrated embodiment of FIG. 12, the king pin subassembly 1250 is mechanically fastened to the grid plate subassembly 1240 by inserting fasteners 1258 vertically through the horizontal grid plate 1242 of the grid plate subassembly 1240 and the longitudinal support channel 1254 of the king pin subassembly 1250. It is also within the scope of the present disclosure that the king pin subassembly 1250 may be adhered to or integrally formed with the grid plate subassembly 1240. When assembled, the king pin 1252 extends vertically downward from the opening 1209 and through the horizontal grid plate 1242.

To assemble the connection 1200, the approach plate subassembly 1230 may be mechanically fastened to composite floor 140, specifically the front wall 1202 of the composite floor 140, using fasteners 1239. As shown in FIG. 12, the front wall 1202 of the composite floor 140 is sandwiched between the front connector 1234 and the interior connectors 1238 of the approach plate subassembly 1230 at locations between adjacent longitudinal support beams 1204. In this arrangement, the front connector 1234 and the interior connectors 1238 may serve as backing or reinforcing plates that support the front wall 1202 for receipt of the fasteners 1239 by reducing potential stress concentrations around the fasteners 1239 and their corresponding holes. Instead of or in addition to using fasteners 1239, it is also within the scope of the present disclosure to adhere the approach plate subassembly 1230 to the composite floor 140.

To further assemble the connection 1200, the grid plate subassembly 1240 and the king pin subassembly 1250 may be adhered to the composite floor 140, specifically the longitudinal support beams 1206 and the lateral support beams 1208 of the composite floor 140. The king pin subassembly 1250 may be sized for receipt within the opening 1209 between the longitudinal support beams 1206 and the lateral support beams 1208 of the composite floor 140. As shown in FIG. 13, the longitudinal support channel 1254 of the king pin subassembly 1250 extends directly along-side the longitudinal support beams 1206 of the composite floor 140.

According to an exemplary embodiment of the present disclosure, the longitudinal support beams 1206 may be trapezoidal in cross-section, tapering inward from top to bottom. To ensure good surface contact for adhesion, the corresponding longitudinal support channel 1254 may have a matching shape, tapering outward from top to bottom.

According to another exemplary embodiment of the present disclosure, the connection 1200 may be integrated with other connections for additional strength and stability. For example, as shown in FIG. 11, the side connectors 1246 of the connection 1200 may be mechanically fastened, adhered, or otherwise coupled to the exterior connector 510 that couples the composite sidewall 160 to the composite floor 140. As another example, and as shown in FIG. 12, the exterior connector 1110 that couples the composite nose 170 to the composite floor 140 may extend downwardly over the approach plate subassembly 1230 to also receive the fasteners 1239.

According to yet another exemplary embodiment of the present disclosure, connection 1200 includes a conduit 1260 to accommodate electrical wiring, air lines, fuel lines, or other equipment. The illustrative conduit 1260 is circular in cross-section, but this shape may vary. As shown in FIG. 11, the illustrative conduit 1260 travels laterally through the longitudinal support beams 1204 and longitudinally through the lateral support beams 1208. The beams 1204, 1208 may be externally and/or internally reinforced at the location of the conduit 1260, such as by adhering or otherwise coupling external reinforcement plates 1262 to the beams 1204, 1208, to reduce potential stress concentrations around the conduit 1260 and its corresponding holes.

Figure 11A:
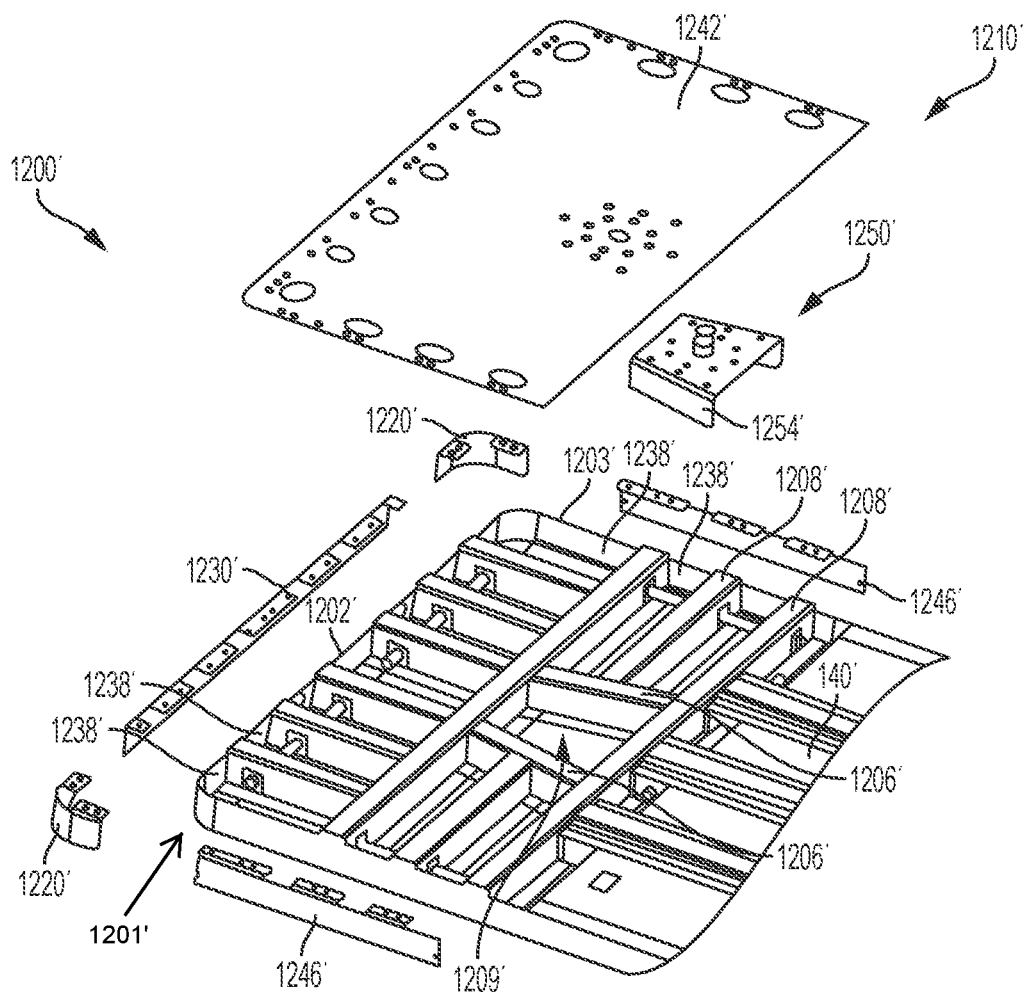
FIG. 11A is an exploded bottom perspective view similar to FIG. 11 showing an alternative coupler assembly.

Referring next to FIG. 11A, an alternative connection 1200' is shown between composite floor 140' and coupler assembly 1210'. The connection 1200' may be similar to the connection 1200 of FIG. 11, with like reference numbers identifying like elements, except as described below.

At the connection 1200', composite floor 140' includes a plurality of support beams 1206' and 1208' that cooperate to define opening 1209'. Longitudinal support beams 1206 of FIG. 11 extend parallel to each other and parallel to longitudinal axis L. By contrast, longitudinal support beams 1206' of FIG. 11A extend inward toward one another near front wall 1202' of composite floor 140'. The resulting opening 1209' is trapezoidal-shaped rather than square-shaped. The corresponding king pin subassembly 1250' is also trapezoidal-shaped rather than square-shaped, with the longitudinal support channel 1254' narrowing near front wall 1202' of composite floor 140' to mimic the inward path of longitudinal support beams 1206'. This trapezoidal shape may improve load distributions during coupling and allow more size tolerance between opening 1209' and the mating king pin subassembly 1250'.

Coupler assembly 1210' includes a horizontal grid plate 1242'. Coupler assembly 1210' also includes right and left front corner reinforcements 1220', a front approach plate subassembly 1230', and right and left side connectors 1246'. Horizontal grid plate 1242 of FIG. 11 terminates before reaching front wall 1202 of composite floor 140 to mate with rear connectors 1236 of approach plate subassembly 1230. By contrast, horizontal grid plate 1242' of FIG. 11A extends entirely to front wall 1202' of composite floor 140' and overlaps front approach plate subassembly 1230'. The front corner reinforcements 1220', front approach plate subassembly 1230', and side connectors 1246' are all L-shaped plates having vertical portions and horizontal portions or tabs. The vertical portions of the corner reinforcements 1220', front approach plate subassembly 1230', and side connectors 1246' are configured to be adhesively bonded to composite skirt 1201' of floor 140', and the horizontal portions of the corner reinforcements 1220', front approach plate subassembly 1230', and side connectors 1246' are configured to be mechanically fastened to the perimeter of the overlapping horizontal grid plate 1242'. The adhesive bond of the corner reinforcements 1220', front approach plate subassembly 1230', and side connectors 1246' to composite floor 140' may improve load distributions and reduce stress on composite floor 140'.

Coupler assembly 1210' may also include a plurality of interior connectors 1238' that serve as backing or reinforcing plates for composite skirt 1201' of floor 140'. In the illustrated embodiment of FIG. 11A, interior connectors 1238' are positioned inside front wall 1202' of composite floor 140' to reinforce composite skirt 1201' for attachment to front approach plate subassembly 1230'. In this embodiment, front wall 1202' of composite floor 140' is sandwiched between front approach plate subassembly 1230' on the outside and interior connectors 1238' on the inside. Additionally, interior connectors 1238' are positioned inside side walls 1203' of composite floor 140' to reinforce composite skirt 1201' for attachment to side connectors 1246' and, in certain embodiments, exterior connector 510 (FIG. 11). In this embodiment, side walls 1203' of composite floor 140' are sandwiched between side connectors 1246' on the outside and interior connectors 1238' on the inside. Interior connectors 1238' may be adhered or otherwise coupled to composite skirt 1201' of floor 140'.

13. Connection Between Composite Floor and Metallic Landing Gear Assembly

Figure 14:
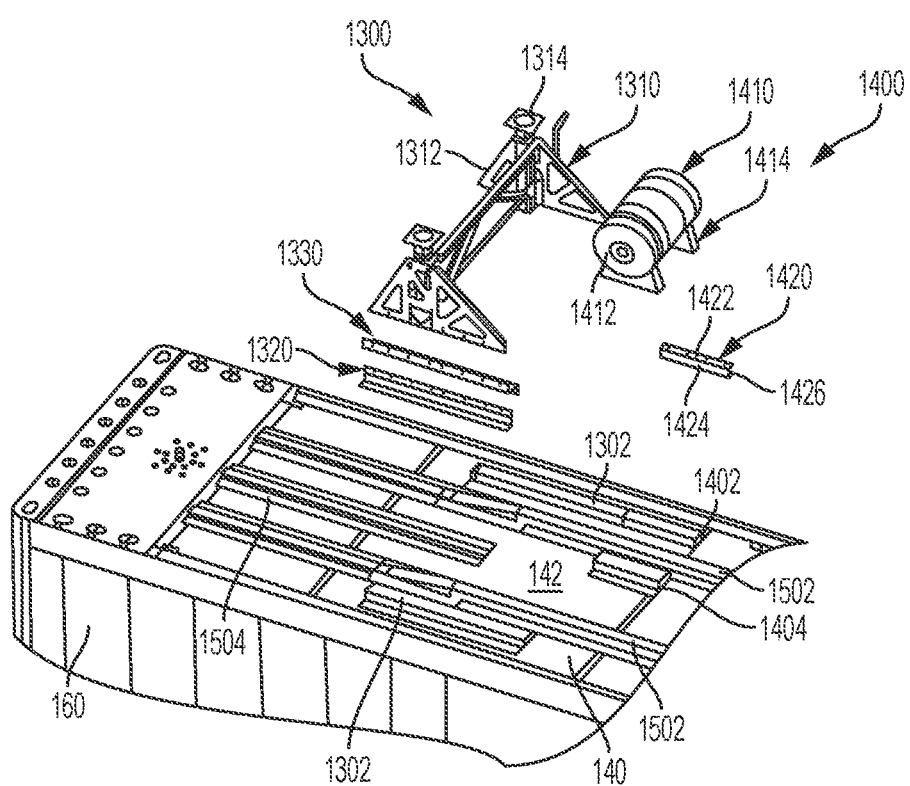
FIG. 14 is an exploded bottom perspective view of a first connection between the floor and the landing gear assembly and a second connection between the floor and the fuel tank assembly.
Figure 15:
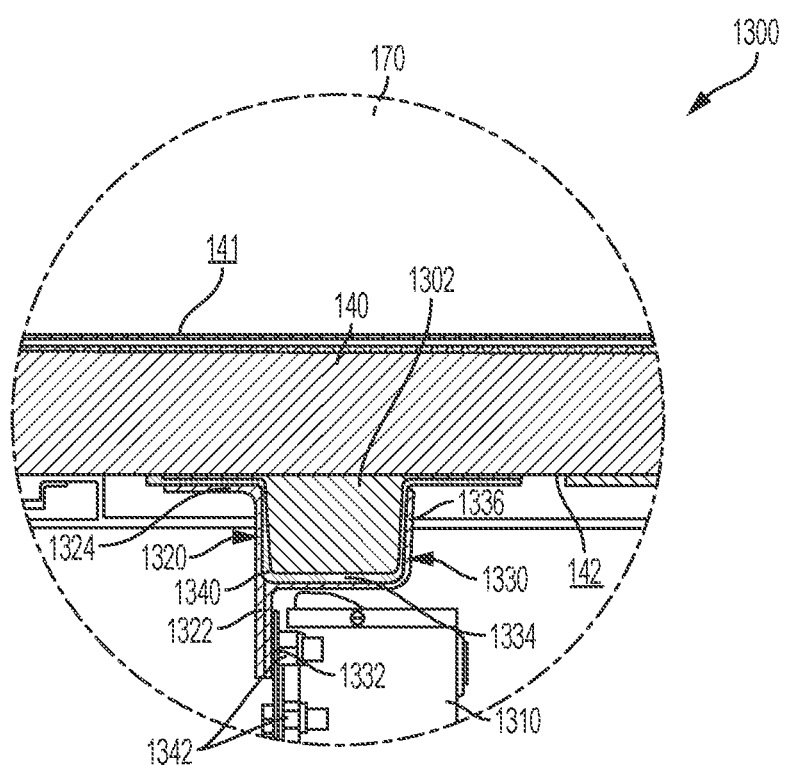
FIG. 15 is an assembled cross-sectional view of the first connection of FIG. 14.

Referring next to FIGS. 14 and 15, a connection 1300 is shown between the composite floor 140 and the landing gear assembly 1310. At the connection 1300, the composite floor 140 includes right and left longitudinal support beams 1302 extending downwardly from the lower surface 142 of the floor 140. The support beams 1302 may be composite structures that are relatively narrow and/or reinforced for additional strength, as discussed in Section 2 above. The support beams 1302 may be relatively short in length to avoid extending unnecessarily beyond the landing gear assembly 1310.

The landing gear assembly 1310 extends across the width of trailer 100 and illustratively includes right and left mounting brackets 1312 corresponding to the right and left support beams 1302 and right and left support legs 1314. The brackets 1312 and/or the legs 1314 of the landing gear assembly 1310 may be metallic structures. The individual pieces of the landing gear assembly 1310 may be welded, mechanically fastened, adhered, snap-fit, or otherwise coupled together.

On each side of the landing gear assembly 1310, the connection 1300 illustratively includes an outer connector 1320 positioned outside of the corresponding support beam 1302 and an inner connector 1330 positioned inside of the corresponding support beam 1302. The illustrative outer connector 1320 is L-shaped in cross-section, having a vertical portion 1322 positioned along-side the support beam 1302 and a horizontal portion 1324 positioned beneath the composite floor 140. The illustrative inner connector 1330 is Z-shaped in cross-section, having a lower vertical portion 1332, an intermediate horizontal portion 1334 positioned beneath the support beam 1302, and an upper vertical portion 1336 positioned along-side the support beam 1302. Both the outer connector 1320 and the inner connector 1330 may be elongate structures or rails that extend along the length of the corresponding support beam 1302. However, as discussed in Section 4 above, the outer connector 1320 and the inner connector 1330 may vary in size and shape.

To assemble each side of the connection 1300, the outer connector 1320 and the inner connector 1330 may be wrapped around and adhesively bonded to the corresponding support beam 1302 of the composite floor 140. Beneath the outer edge 1340 of the support beam 1302, both the vertical portion 1322 of the outer connector 1320 and the vertical portion 1332 of the inner connector 1330 may extend downwardly together toward the landing gear assembly 1310, as shown in FIG. 15. In this arrangement, the landing gear assembly 1310 may be aligned beneath the support beam 1302 and mechanically fastened to both the outer connector 1320 and the inner connector 1330 with fasteners 1342. Instead of or in addition to using fasteners 1342, it is also within the scope of the present disclosure to adhere the landing gear assembly 1310 to the outer connector 1320 and/or the inner connector 1330.

According to an exemplary embodiment of the present disclosure, the support beams 1302 may be trapezoidal in cross-section, tapering inward from top to bottom. To ensure good surface contact for adhesion, the outer connector 1320 and the inner connector 1330 may have a matching shape, tapering inward from top to bottom.

14. Connection Between Composite Floor and Metallic Fuel Tank Assembly

Referring still to FIG. 14, a connection 1400 is shown between the composite floor 140 and the fuel assembly 1410. At the connection 1400, the composite floor 140 includes an outer longitudinal support beam 1402 and an inner longitudinal support beam 1404 extending downwardly from the lower surface 142 of the floor 140. The support beams 1402, 1404 may be composite structures that are relatively narrow and/or reinforced for additional strength, as discussed in Section 2 above. The support beams 1402, 1404 may be relatively short in length to avoid extending unnecessarily beyond the fuel tank assembly 1410. In certain embodiments, the outer support beam 1402 of the present connection 1400 may be an extension of the support beam 1302 of the previously-described connection 1300 for the landing gear assembly 1310.

The fuel tank assembly 1410 extends partially across the width of trailer 100 and illustratively includes a fuel tank 1412 and right and left mounting brackets 1414 corresponding to the support beams 1402, 1404. The brackets 1414, in particular, may be metallic structures. The individual pieces of the fuel tank assembly 1410 may be welded, mechanically fastened, adhered, snap-fit, or otherwise coupled together.

On each side of the fuel tank assembly 1410, the connection 1400 illustratively includes a connector 1420 associated with the corresponding support beam 1402, 1404. The illustrative connector 1420 is U-shaped in cross-section, having a lower horizontal portion 1422, an intermediate vertical portion 1424 positioned along-side the corresponding support beam 1402, 1404, and an upper horizontal portion 1426 positioned beneath the composite floor 140. The illustrative connector 1420 is also an elongate structure that extends along the length of the corresponding support beam 1402, 1404. However, as discussed in Section 4 above, the connector 1420 may vary in size and shape.

To assemble each side of the connection 1400, the connector 1420 may be adhesively bonded to the corresponding support beam 1402, 1404. In this arrangement, the lower horizontal portion 1422 of the connector 1420 may project from the support beam 1402, 1404 for mechanical fastening to the corresponding bracket 1414 of the fuel tank assembly 1410. It is also within the scope of the present disclosure that the fuel tank assembly 1410 may be adhesively bonded to the connectors 1420 rather than or in addition to being mechanically fastened to the connectors 1420.

15. Connection Between Composite Floor and Metallic Slide Rail Assembly

Figure 16:
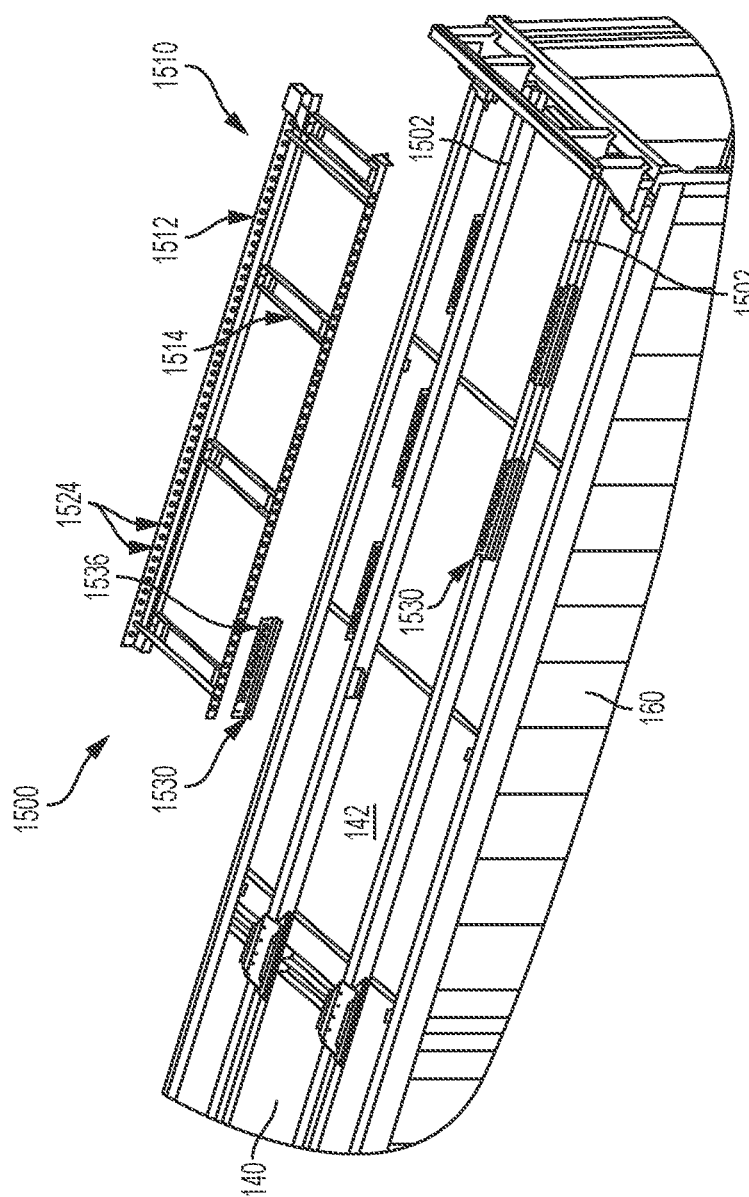
FIG. 16 is an exploded bottom perspective view of a connection between the floor and the slide rail assembly.
Figure 17:
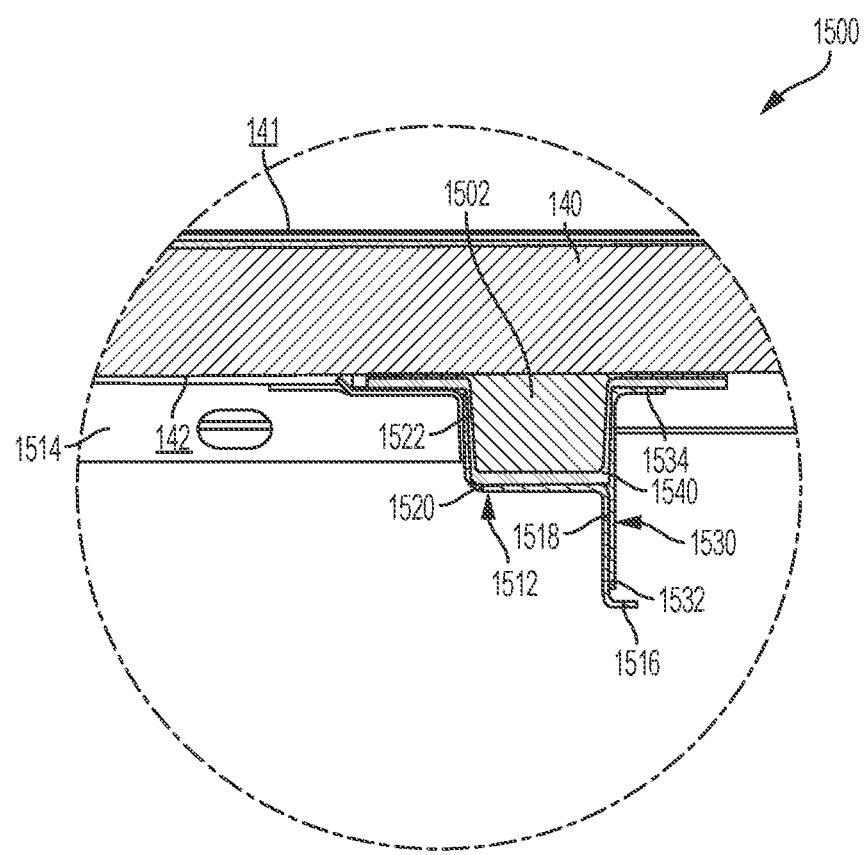
FIG. 17 is an assembled cross-sectional view of the connection of FIG. 16.

Referring next to FIGS. 16 and 17, a connection 1500 is shown between the composite floor 140 and the slide rail assembly 1510. At the connection 1500, the composite floor 140 includes right and left longitudinal support beams 1502 extending downwardly from the lower surface 142 of the floor 140. The support beams 1502 may be composite structures that are relatively narrow and/or reinforced for additional strength, as discussed in Section 2 above.

The slide rail assembly 1510 illustratively includes right and left rails 1512 corresponding to the right and left support beams 1502 and a plurality of lateral supports 1514 extending therebetween. As shown in FIG. 17, each rail 1512 is step-shaped in cross section, having a lower horizontal portion or flange 1516, a lower vertical portion 1518, an intermediate horizontal portion 1520 positioned beneath the support beam 1502, and an upper vertical portion 1522 positioned along-side the support beam 1502. To couple the trailer 100 to the wheel assembly (not shown), each rail 1512 defines a series of holes 1524. The rails 1512 and/or the lateral supports 1514 of the slide rail assembly 1510 may be metallic structures. The slide rail assembly 1510 may be a single-piece or a multi-piece construct. For multi-piece constructs, the pieces may be welded, mechanically fastened, adhered, snap-fit, or otherwise coupled together.

Figure 16A:
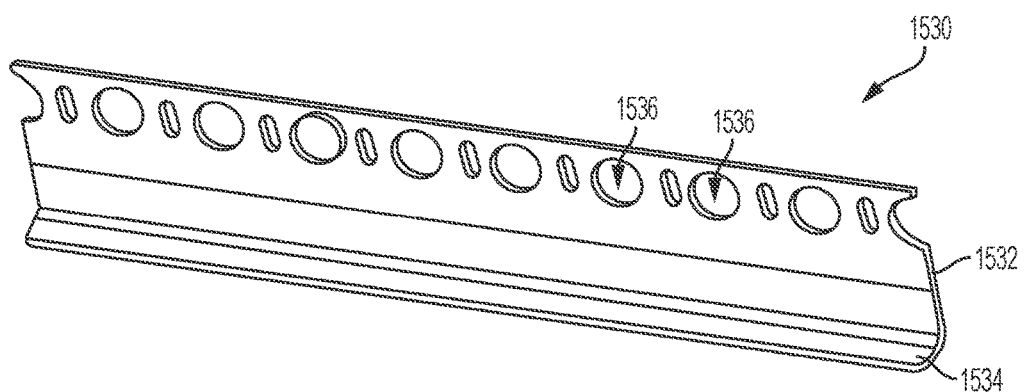
FIG. 16A is a perspective view of an outer connector used in the connection of FIG. 16.
Figure 16B:
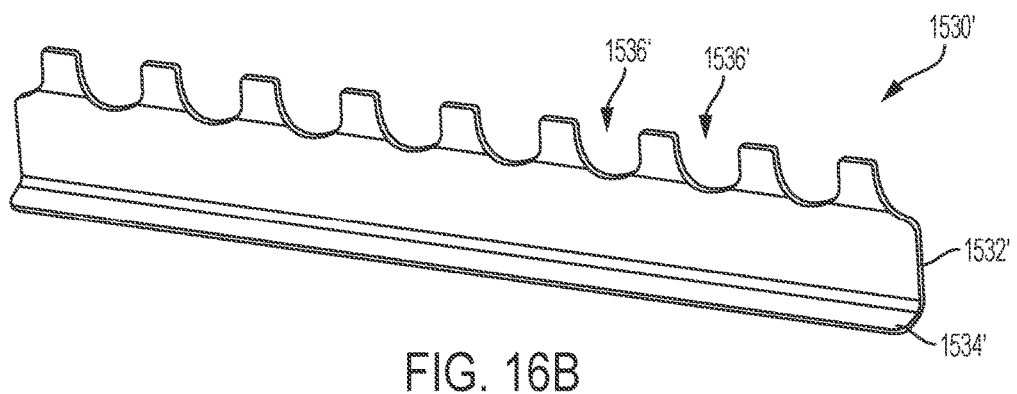
FIG. 16B is a perspective view similar to FIG. 16A showing an alternative outer connector.

On each side of the slide rail assembly 1510, the connection 1500 illustratively includes a series of outer connectors 1530 positioned outside of the corresponding support beam 1502. Rather than having a series of outer connectors 1530 on each side, it is also within the scope of the present disclosure to have a single, elongate outer connector 1530 on each side spanning the entire length of the corresponding rail 1512. As shown in FIG. 16A, each outer connector 1530 is illustratively L-shaped in cross-section, having a vertical portion 1532 with holes 1536 and a horizontal portion 1534. The outer connector 1530 is also shown in FIG. 17 with the vertical portion 1532 positioned along-side the support beam 1502 and the horizontal portion 1534 positioned beneath the composite floor 140. However, as discussed in Section 4 above, the outer connector 1530 may vary in size and shape. For example, an alternative outer connector 1530' is shown in FIG. 16B and includes a vertical portion 1532' with partial holes 1536' and a horizontal portion 1534'.

To assemble each side of the connection 1500, the rail 1512 and the outer connector 1530 may be wrapped around and adhesively bonded to the corresponding side and bottom surfaces of support beam 1502 of the composite floor 140. In this arrangement, shear connections along-side each support beam 1502 may reduce the resulting tensile load on the adhesive used along the bottom surface of each support beam 1502. The rail 1512 and the outer connector 1530 may also be welded, adhesively bonded, mechanically fastened, or otherwise coupled to each other. Beneath the outer edge 1540 of the support beam 1502, both the lower vertical portion 1518 of the rail 1512 and the vertical portion 1532 of the outer connector 1530 may extend downwardly together toward the wheel assembly (not shown). Holes 1536 in the outer connector 1530 (FIG. 16A) or partial holes 1536' in outer connector 1530' (FIG. 16B) may correspond with holes 1524 in the rail 1512. In this arrangement, the wheel assembly may be aligned beneath the support beam 1502 and coupled to both the rail 1512 and the outer connector 1530 through their overlapping holes 1524, 1536, or 1536'.

According to an exemplary embodiment of the present disclosure, the support beams 1502 may be trapezoidal in cross-section, tapering inward from top to bottom. To ensure good surface contact for adhesion, the rails 1512 and the outer connectors 1530 may have a matching shape, tapering inward from top to bottom.

According to another exemplary embodiment of the present disclosure, the support beams 1502 of the connection 1500 may serve as the main support beams for the cargo body 130. Therefore, the support beams 1502 may extend substantially the entire length of the cargo body 130. Returning to FIG. 2, for example, the support beams 1502 extend from just behind the coupler assembly 1210 at the front end 102 to the rear end 104 of the cargo body 130. The illustrative support beams 1502 decrease in height between the coupler assembly 1210 and the landing gear assembly 1310 to provide adequate swing clearance for the tractor fifth wheel (not shown). The cargo body 130 may include additional support beams for additional support near the tractor (not shown), illustratively a central support beam 1504 that is centrally located between the right and left support beams 1502.

16. Connection Between Front and Rear Composite Sidewall Sections

In certain embodiments, the composite sidewall 160 may be manufactured in a plurality of discrete sections instead of a single section. This sectioned manufacturing approach may accommodate smaller molds and facilitate transportation, storage, and repairs, for example. It is also within the scope of the present disclosure that the composite sidewall 160 may be manufactured in a single section.

Figure 18:
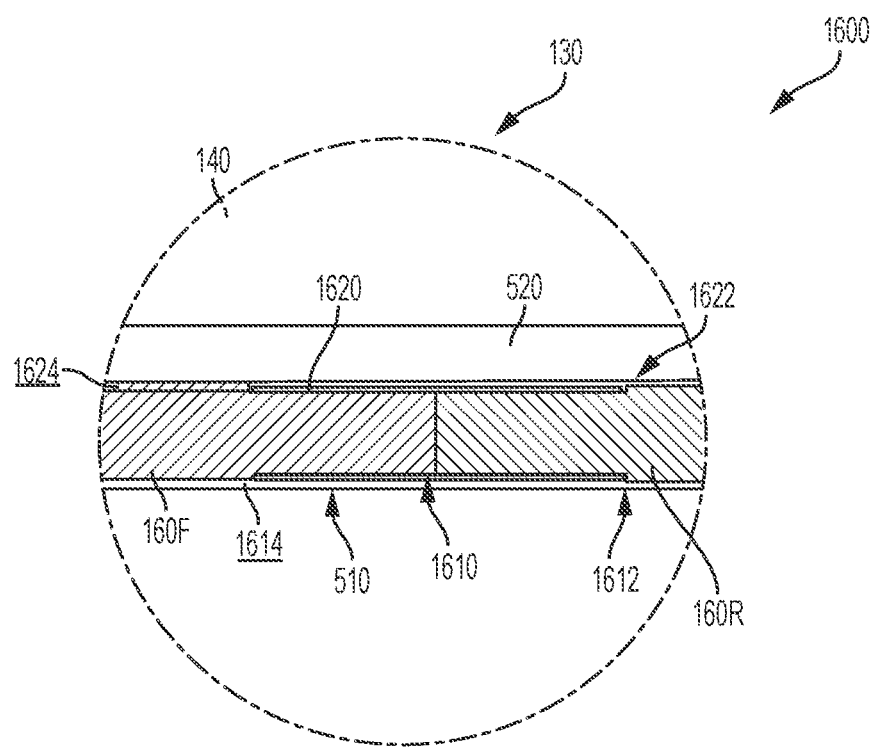
FIG. 18 is an assembled cross-sectional view of a connection between a front sidewall section and a rear sidewall section.

Referring next to FIG. 18, a connection 1600 is shown between a front composite sidewall section 160F and a rear composite sidewall section 160R. The composite sidewall sections 160F, 160R may be in direct contact with each other. Rather than having flat surfaces, as shown in FIG. 18, the composite sidewall sections 160F, 160R may have interlocking features, such as tongue and groove features. It is also within the scope of the present disclosure to apply adhesive or another filler (e.g., insulating tape, caulk, sealant, foam) between the composite sidewall sections 160F, 160R, such as when necessary to fill intentional or unintentional spaces between the components.

The connection 1600 illustratively includes an exterior connector 1610 positioned outside of the cargo body 130 and an interior connector 1620 positioned inside of the cargo body 130. The illustrative connectors 1610, 1620 are both flat plates that span between the adjoining composite sidewall sections 160F, 160R. Also, the illustrative connectors 1610, 1620 are both elongate structures or rails that extend vertically along the height of trailer 100. However, as discussed in Section 4 above, the connectors 1610, 1620 may vary in size and shape. For example, rather than being flat plates, as shown in FIG. 18, one or both connectors 1610, 1620 may be T-shaped structures that project between the composite sidewall sections 160F, 160R. Alternatively, multiple T-shaped connectors 1610, 1620 may be combined into a single H-shaped structure.

To assemble the connection 1600, the exterior connector 1610 may be adhesively bonded to exterior surfaces of both composite sidewall sections 160F, 160R. Similarly, the interior connector 1620 may be adhesively bonded to interior surfaces of both composite sidewall sections 160F, 160R.

According to an exemplary embodiment of the present disclosure, the composite sidewall sections 160F, 160R cooperate to define an exterior recess 1612 that is sized and shaped to receive the exterior connector 1610. When assembled, the composite sidewall sections 160F, 160R and the exterior connector 1610 may cooperate to define a flush exterior surface 1614 to accommodate the exterior connector 510 that couples the composite sidewall 160 to the composite floor 140 (FIG. 5) and the exterior connector 610 that couples the composite sidewall 160 to the composite roof 150 (FIG. 6).

According to another exemplary embodiment of the present disclosure, the composite sidewall sections 160F, 160R cooperate to define an interior recess 1622 that is sized and shaped to receive the interior connector 1620. When assembled, the composite sidewall sections 160F, 160R and the interior connector 1620 may cooperate to define a flush interior surface 1624 to accommodate the interior connector 520 that couples the composite sidewall 160 to the composite floor 140 (FIG. 5) and the interior connector 620 that couples the composite sidewall 160 to the composite roof 150 (FIG. 6).

17. Connection Between Front and Rear Composite Roof Sections

In certain embodiments, the composite roof 150 may be manufactured in a plurality of discrete sections instead of a single section. This sectioned manufacturing approach may accommodate smaller molds and facilitate transportation, storage, and repairs, for example. It is also within the scope of the present disclosure that the composite roof 150 may be manufactured in a single section.

Figure 19:
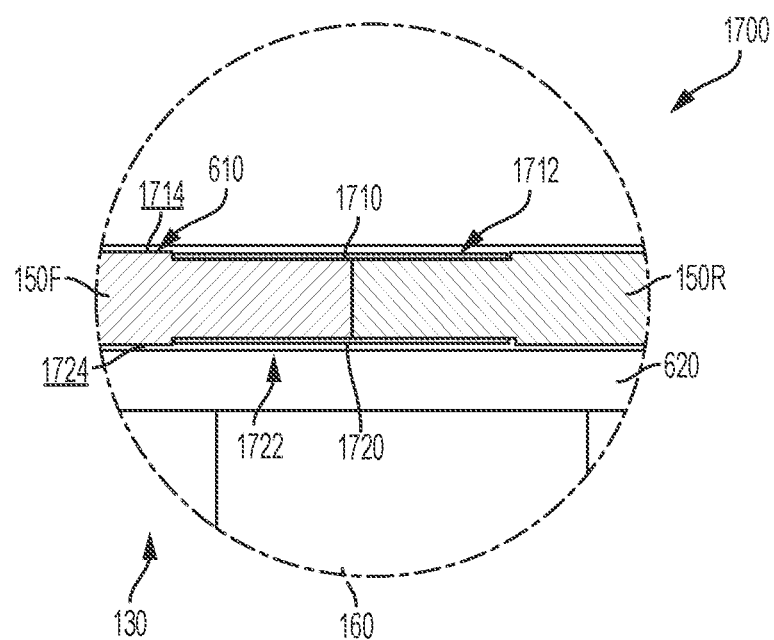
FIG. 19 is an assembled cross-sectional view of a connection between a front roof section and a rear roof section.

Referring next to FIG. 19, a connection 1700 is shown between a front composite roof section 150F and a rear composite roof section 150R. The composite roof sections 150F, 150R may be in direct contact with each other. Rather than having flat surfaces, as shown in FIG. 19, the composite roof sections 150F, 150R may have interlocking features, such as tongue and groove features. It is also within the scope of the present disclosure to apply adhesive or another filler (e.g., insulating tape, caulk, sealant, foam) between the composite roof sections 150F, 150R, such as when necessary to fill intentional or unintentional spaces between the components.

The connection 1700 illustratively includes an exterior connector 1710 positioned outside of the cargo body 130 and an interior connector 1720 positioned inside of the cargo body 130. The illustrative connectors 1710, 1720 are both flat plates that span between the adjoining composite roof sections 150F, 150R. Also, the illustrative connectors 1710, 1720 are both elongate structures or rails that extend horizontally across the width of trailer 100. However, as discussed in Section 4 above, the connectors 1710, 1720 may vary in size and shape. For example, rather than being flat plates, as shown in FIG. 19, one or both connectors 1710, 1720 may be T-shaped structures that project between the composite roof sections 150F, 150R. Alternatively, multiple T-shaped connectors 1710, 1720 may be combined into a single H-shaped structure.

To assemble the connection 1700, the exterior connector 1710 may be adhesively bonded to exterior surfaces of both composite roof sections 150F, 150R. Similarly, the interior connector 1720 may be adhesively bonded to interior surfaces of both composite roof sections 150F, 150R.

According to an exemplary embodiment of the present disclosure, the composite roof sections 150F, 150R cooperate to define an exterior recess 1712 that is sized and shaped to receive the exterior connector 1710. When assembled, the composite roof sections 150F, 150R and the exterior connector 1710 may cooperate to define a flush exterior surface 1714 to accommodate the exterior connector 610 that couples the composite sidewall 160 to the composite roof 150 (FIG. 6).

According to another exemplary embodiment of the present disclosure, the composite roof sections 150F, 150R cooperate to define an interior recess 1722 that is sized and shaped to receive the interior connector 1720. When assembled, the composite roof sections 150F, 150R and the interior connector 1720 may cooperate to define a flush interior surface 1724 to accommodate the interior connector 620 that couples the composite sidewall 160 to the composite roof 150 (FIG. 6).

18. Connection Between Front and Rear Composite Floor Sections

In certain embodiments, the composite floor 140 may be manufactured in a plurality of discrete sections instead of a single section. This sectioned manufacturing approach may accommodate smaller molds and facilitate transportation, storage, and repairs, for example. It is also within the scope of the present disclosure that the composite floor 140 may be manufactured in a single section.

Figure 20:
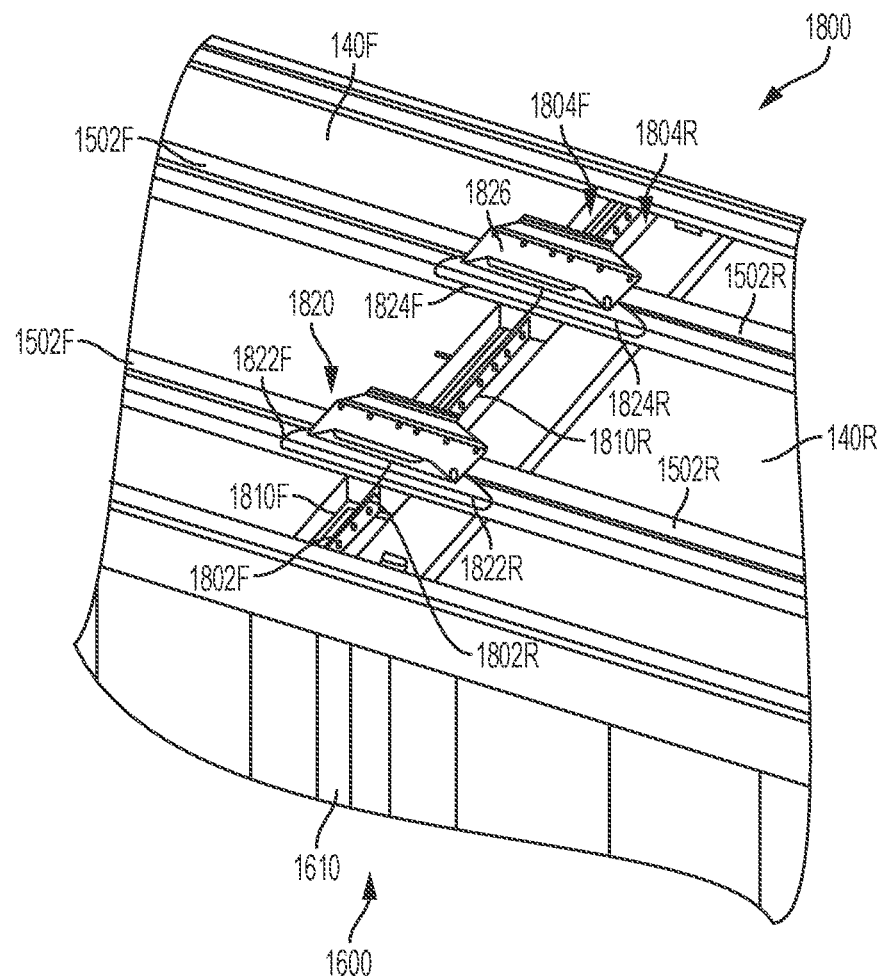
FIG. 20 is a bottom perspective view of a connection between a front floor section and a rear floor section.
Figure 22:
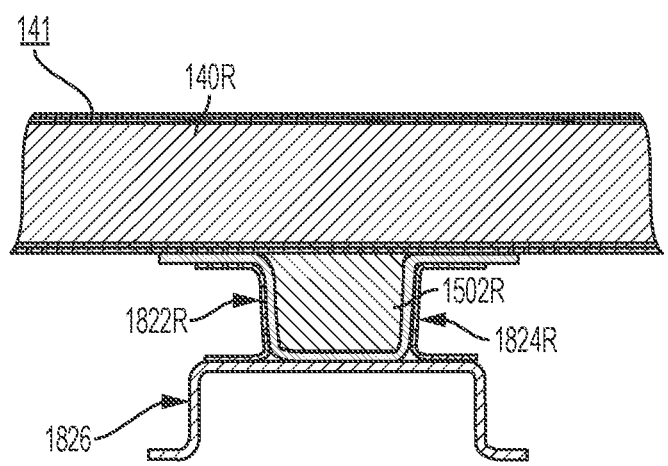
FIG. 22 is an assembled cross-sectional view of the connection of FIG. 21, taken along line 22-22 of FIG. 21.

Referring next to FIGS. 20-22, a connection 1800 is shown between a front composite floor section 140F and a rear composite floor section 140R. The front composite floor section 140F includes front longitudinal support beams 1502F, and the rear composite floor section 140R includes rear longitudinal support beams 1502R aligned with the front longitudinal support beams 1502F. At its rear end, the front composite floor section 140F includes a composite wall 1802F adjacent to recesses 1804F, which are positioned outside of and between the front support beams 1502F. Similarly, at its front end, the rear composite floor section 140R includes a composite wall 1802R adjacent to recesses 1804R, which are positioned outside of and between the rear support beams 1502R. The composite walls 1802F, 1802R may be in direct contact with each other. Rather than having flat surfaces, as shown in FIG. 21, the composite walls 1802F, 1802R may have interlocking features, such as tongue and groove features. It is also within the scope of the present disclosure to apply adhesive or another filler (e.g., insulating tape, caulk, sealant, foam) between the composite walls 1802F, 1802R, such as when necessary to fill intentional or unintentional spaces between the components.

The connection 1800 illustratively includes one or more front connectors 1810F positioned in the recesses 1804F of the front composite floor section 140F, and one or more rear connectors 1810R positioned in the recesses 1804R of the rear composite floor section 140R. Each of the illustrative front and rear connectors 1810F, 1810R is an L-shaped bracket, having a vertical portion 1812 positioned along-side the corresponding wall 1802F, 1802R, and a horizontal portion 1814 positioned beneath the composite floor sections 140F, 140R. However, as discussed in Section 4 above, the front and rear connectors 1810F, 1810R may vary in size and shape. For example, rather than being L-shaped brackets, as shown in FIG. 21, the front and rear connectors 1810F, 1810R may be flat plates.

To assemble the connection 1800, the front connector 1810F may be positioned in the recess 1804F and adhesively bonded to the front composite floor section 140F, including the composite wall 1802F of the front composite floor section 140F. Similarly, the rear connectors 1810R may be positioned in the recess 1804R and adhesively bonded to the rear composite floor section 140R, including the composite wall 1802R of the rear composite floor section 140R. Next, the adjoining walls 1802F, 1802R may be mechanically fastened together using fasteners 1816. In this arrangement, the front and rear connectors 1810F, 1810R may serve as backing or reinforcing plates that support the walls 1802F, 1802R for receipt of the fasteners 1816 by reducing potential stress concentrations around the fasteners 1816 and their corresponding holes.

Additionally, each side of the connection 1800 illustratively includes a bridge connector 1820 that spans across the adjacent support beams 1502F, 1502R. As shown in FIG. 22, each bridge connector 1820 includes generally U-shaped outer portions 1822F, 1822R, generally U-shaped inner portions 1824F, 1824R, and a horizontal portion 1826. The illustrative bridge connector 1820 is a multi-piece construct, wherein the horizontal portion 1826 is mechanically fastened to both outer portions 1822F, 1822R and both inner portions 1824F, 1824R, but it is also within the scope of the present disclosure that the bridge connector 1820 may be a single-piece construct, for example.

To further assemble the connection 1800, the bridge connector 1820 may be positioned beneath and adhesively bonded to the adjacent floor sections 140F, 140R, specifically the support beams 1502F, 1502R of the adjacent floor sections 140F, 140R. In this position, the outer portions 1822F, 1822R, the inner portions 1824F, 1824R, and the horizontal portion 1826 of the bridge connector 1820 may wrap around and support each support beam 1502F, 1502R along the connection 1800. As shown in FIG. 22, the outer portions 1822F, 1822R and the inner portions 1824F, 1824R of the bridge connector 1820 directly contact the support beams 1502F, 1502R.

According to an exemplary embodiment of the present disclosure, the support beams 1502F, 1502R may be trapezoidal in cross-section, tapering inward from top to bottom. To ensure good surface contact for adhesion, the bridge connector 1820 may have a matching shape, tapering inward from top to bottom.

According to another exemplary embodiment of the present disclosure, the connection 1800 between the composite floor sections 140F, 140R may be longitudinally offset from the connection 1600 between the composite sidewall sections 160F, 160R and/or the connection 1700 between the composite roof sections 150F, 150R. For example, in the illustrated embodiment of FIG. 20, the connection 1800 is positioned longitudinally forward of the connection 1600 by several inches or more. This offset may help distribute forces between front and rear sections of the trailer 100, for example.

19. Connection Between Composite Floor and an Underbody Accessory

Figure 23:
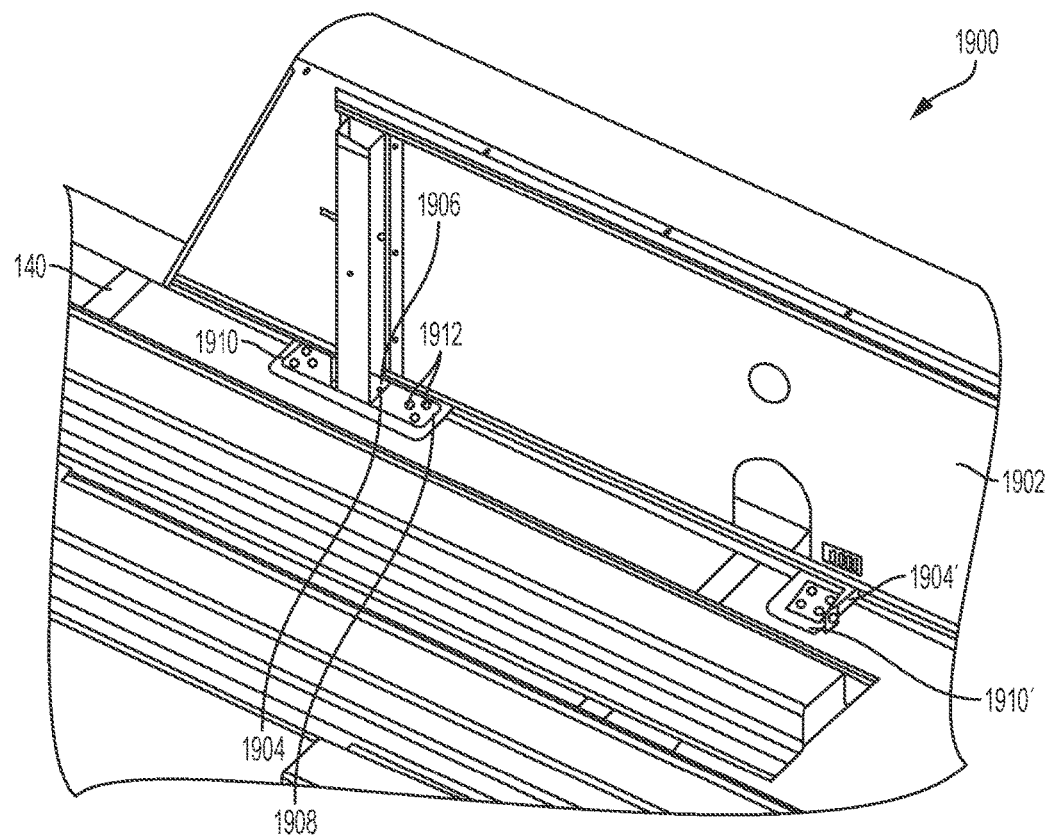
FIG. 23 is a bottom perspective view of a connection between the floor and an aerodynamic trailer skirt.
Figure 24:
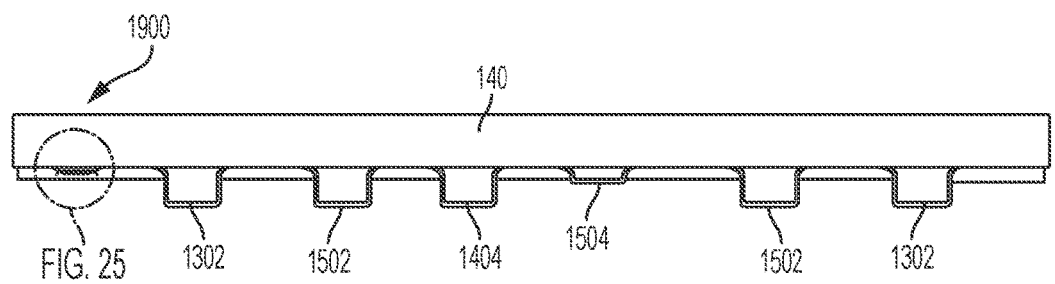
FIG. 24 is a rear elevational view of the connection of FIG. 23.
Figure 25:
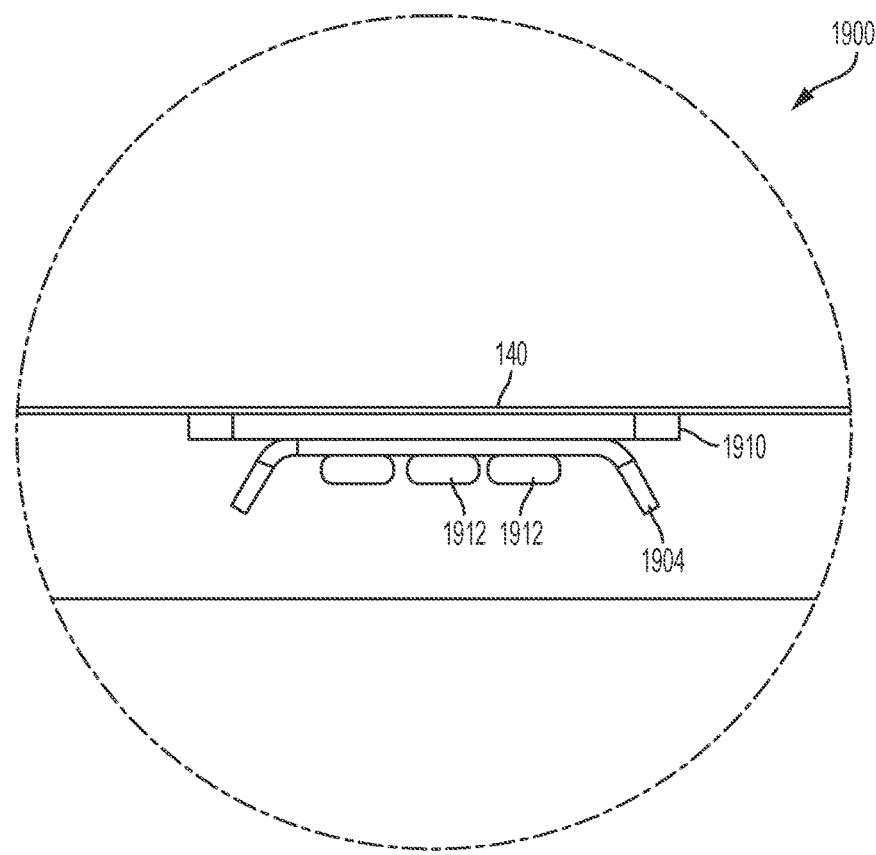
FIG. 25 is a detailed view of the area circled in FIG. 24.

Referring next to FIGS. 23-25, a connection 1900 is shown between the composite floor 140 and an underbody accessory 1902, illustratively an aerodynamic trailer skirt. An exemplary trailer skirt is the AeroSkirt® available from Wabash National Corporation of Lafayette, Ind. Other suitable underbody accessories 1902 include tire carriers, air tanks, fuel tanks, and airlines, for example. In addition to underbody accessories 1902 mounted under floor 140, connection 1900 may be adapted to mount other accessories, such as gladhand brackets, manifest boxes, card holders, placards, and steps, to other locations of cargo body 130, such as the roof 150, right and left sidewalls 160, and/or nose 170 (FIG. 1).

The underbody accessory 1902 includes at least one corresponding mounting bracket 1904 having a first portion 1906 designed to couple with the accessory 1902 and a second portion 1908 designed to couple with a vehicle underbody. Because the mounting bracket 1904 is designed to couple with the particular underbody accessory 1902, the size, shape, and configuration of the mounting bracket 1904 may vary depending on the size, shape, and configuration of the underbody accessory 1902. In the illustrated embodiment of FIG. 23, for example, the trailer skirt accessory 1902 includes a first generally T-shaped mounting bracket 1904 and a second generally L-shaped mounting bracket 1904'.

The connection 1900 includes an intermediate connector 1910, 1910' positioned between the composite floor 140 and each mounting bracket 1904, 1904'. Each of the illustrative intermediate connectors 1910, 1910' is a flat plate sized slightly larger than the corresponding mounting bracket 1904, 1904'. However, as discussed in Section 4 above, the intermediate connectors 1910, 1910' may vary in size and shape. The intermediate connectors 1910, 1910' may be constructed of, coated with, or covered by an anti-corrosive material (e.g., film) to prevent corrosion between the intermediate connectors 1910, 1910' and the adjacent mounting brackets 1904, 1904'.

To assemble the connection 1900, each intermediate connector 1910, 1910' may be adhesively bonded to the composite floor 140 in the area that will accommodate each mounting bracket 1904, 1904'. It is also within the scope of the present disclosure that each intermediate connector 1910, 1910' may be molded to the composite floor 140 during the manufacturing process. Next, each mounting bracket 1904, 1904' may be mechanically fastened to the composite floor 140 through the corresponding intermediate connector 1910, 1910', such as using fasteners 1912 (e.g., pull rivets). In this arrangement, the intermediate connectors 1910, 1910' may serve as receiving plates that receive and engage the fasteners 1912. Additionally, the intermediate connectors 1910, 1910' may serve as reinforcing plates that support composite floor 140 for receipt of the fasteners 1912 by reducing potential stress concentrations around the fasteners 1912 and their corresponding holes. Furthermore, the intermediate connectors 1910, 1910' may help distribute shear, tensile, or compressive loads across a larger area of composite floor 140 to reduce the possibility of stress cracks forming around the holes.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A semi-trailer for use with a tractor, the semi-trailer comprising:
    a composite floor having:
        an upper surface;
        a lower surface;
        a right longitudinal support beam that extends downward from the lower surface, wherein the right longitudinal support beam is made from a composite material; and
        a left longitudinal support beam that extends downward from the lower surface, wherein the left longitudinal support beam is made from a composite material; and
    a roof;
    a right sidewall coupled to the floor and the roof;
    a left sidewall coupled to the floor and the roof;
    a nose coupled to the floor, the roof, the right sidewall, and the left sidewall; and
    a slide rail assembly defining a plurality of holes configured to couple the semi-trailer to a wheel assembly, the slide rail assembly comprising:
        a right rail coupled to and vertically aligned with the right longitudinal support beam of the composite floor; and
        a left rail coupled to and vertically aligned with the left longitudinal support beam of the composite floor.

2. The semi-trailer of claim 1, wherein:
    the right rail of the slide rail assembly is adhesively bonded to the right longitudinal support beam of the composite floor; and
    the left rail of the slide rail assembly is adhesively bonded to the left longitudinal support beam of the composite floor.

3. The semi-trailer of claim 1, further comprising:
    a right connector that cooperates with the right rail of the slide rail assembly to surround side and bottom surfaces of the right longitudinal support beam of the composite floor; and
    a left connector that cooperates with the left rail of the slide rail assembly to surround side and bottom surfaces of the left longitudinal support beam of the composite floor.

4. The semi-trailer of claim 1, wherein:
    the right rail includes a plurality of holes located beneath the right longitudinal support beam of the composite floor; and
    the left rail includes a plurality of holes located beneath the left longitudinal support beam of the composite floor.

5. The semi-trailer of claim 1, wherein:
    each of the right and left longitudinal support beams tapers inward from top to bottom; and
    each of the right and left rails mimics the taper of the corresponding longitudinal support beam.

6. The semi-trailer of claim 1, further comprising a king pin assembly configured to couple the semi-trailer to the tractor, wherein the right and left longitudinal support beams extend from the slide rail assembly at a rear end of the semi-trailer to the king pin assembly at a front end of the semi-trailer.

7. The semi-trailer of claim 6, wherein the lower surface of the composite floor is flush with a horizontal grid plate of the king pin assembly.

8. A semi-trailer for use with a tractor, the semi-trailer comprising:
    a composite floor having:
        an upper surface;
        a lower surface;
        a first longitudinal support beam that extends downward from the lower surface, wherein the first longitudinal support beam is made from a composite material; and
        a second longitudinal support beam that extends downward from the lower surface, wherein the second longitudinal support beam is made from a composite material; and
    a roof;
    a right sidewall coupled to the floor and the roof;
    a left sidewall coupled to the floor and the roof;
    a nose coupled to the floor, the roof, the right sidewall, and the left sidewall; and
    a landing gear assembly configured to support the semi-trailer on the ground, the landing gear assembly coupled to and vertically aligned with the first and second longitudinal support beams of the composite floor.

9. The semi-trailer of claim 8, further comprising:
    a first connector adhesively bonded to the first longitudinal support beam of the composite floor and mechanically fastened to a first leg of the landing gear assembly; and
    a second connector adhesively bonded to the second longitudinal support beam of the composite floor and mechanically fastened to a second leg of the landing gear assembly.

10. The semi-trailer of claim 9, wherein:
    each of the first and second longitudinal support beams tapers inward from top to bottom; and
    each of the first and second connectors mimics the taper of the corresponding longitudinal support beam.

11. The semi-trailer of claim 8, further comprising:
    a third longitudinal support beam that extends from the lower surface of the composite floor, wherein the third longitudinal support beam is made from a composite material; and
    a fuel tank assembly coupled to the first and third longitudinal support beams of the composite floor.

12. The semi-trailer of claim 11, wherein the first longitudinal support beam is longer than the third longitudinal support beam.

13. A semi-trailer for use with a tractor, the semi-trailer comprising:
    a composite floor having:
        a first internal support beam made from a composite material;

a second internal support beam made from a composite material;

a third internal support beam made from a composite material;

a fourth internal support beam made from a composite material, wherein the third and fourth internal support beams extend perpendicular to a longitudinal axis of the semi-trailer and the first and second internal support beams are positioned longitudinally intermediate the third and fourth internal support beams; and a recess defined between the first and second internal support beams; and a roof;

a right sidewall coupled to the floor and the roof;

a left sidewall coupled to the floor and the roof;

a nose coupled to the floor, the roof, the right sidewall, and the left sidewall; and a king pin assembly configured to couple the semi-trailer to the tractor, the king pin assembly being received within the recess and adhesively bonded to the first and second internal support beams of the composite floor.

14. The semi-trailer of claim 13, wherein the third and fourth internal support beams define the recess.

15. The semi-trailer of claim 13, further comprising a grid plate adhesively bonded to the first and second internal support beams of the composite floor to support the king pin assembly in an opening of the composite floor.

16. The semi-trailer of claim 15, wherein the grid plate is flush with a lower surface of the composite floor.

17. The semi-trailer of claim 13, further comprising:

an underbody accessory having a mounting bracket; and an intermediate connector bonded to the composite floor and mechanically coupled to the mounting bracket.

18. The semi-trailer of claim 13, wherein the composite floor further comprises:

a fifth internal support beam made from a composite material and positioned laterally outward of the first internal support beam; and a sixth internal support beam made from a composite material and positioned laterally outward of the second internal support beam.

19. A semi-trailer for use with a tractor, the semi-trailer comprising:

a composite floor having:
　a first internal support beam made from a composite material;
　a second internal support beam made from a composite material; and
　a recess defined between the first and second internal support beams; and a roof;

a right sidewall coupled to the floor and the roof;

a left sidewall coupled to the floor and the roof;

a nose coupled to the floor, the roof, the right sidewall, and the left sidewall; and a king pin assembly configured to couple the semi-trailer to the tractor, the king pin assembly being received within the recess and adhesively bonded to the first and second internal support beams of the composite floor, wherein:

each of the first and second internal support beams tapers inward from top to bottom; and the king pin assembly tapers outward from top to bottom.

20. A semi-trailer for use with a tractor, the semi-trailer comprising:

a composite floor having:
　a first internal support beam made from a composite material;
　a second internal support beam made from a composite material; and
　a recess defined between the first and second internal support beams; and a roof;

a right sidewall coupled to the floor and the roof;

a left sidewall coupled to the floor and the roof;

a nose coupled to the floor, the roof, the right sidewall, and the left sidewall; and a king pin assembly configured to couple the semi-trailer to the tractor, the king pin assembly being received within the recess and adhesively bonded to the first and second internal support beams of the composite floor, wherein:

the first and second internal support beams travel inward toward one another such that the recess is trapezoidal-shaped; and the king pin assembly mimics the trapezoidal-shape of the recess.

21. A semi-trailer for use with a tractor, the semi-trailer comprising:

a composite floor having:
　a first internal support beam made from a composite material;
　a second internal support beam made from a composite material; and
　a recess defined between the first and second internal support beams; and a roof;

a right sidewall coupled to the floor and the roof;

a left sidewall coupled to the floor and the roof;

a nose coupled to the floor, the roof, the right sidewall, and the left sidewall; and a king pin assembly configured to couple the semi-trailer to the tractor, the king pin assembly being received within the recess and adhesively bonded to the first and second internal support beams of the composite floor, wherein the composite floor includes a composite skirt positioned around the first and second internal support beams, wherein the composite skirt is sandwiched between at least one outer connector and at least one interior connector.

* * * * *